(12) United States Patent
Peterson et al.

(10) Patent No.: US 7,380,024 B2
(45) Date of Patent: May 27, 2008

(54) SYSTEM AND METHOD FOR COMMUNICATION WITH HOST INTERNAL AREA ACCESS

(75) Inventors: Mitchell O Peterson, Mercer Island, WA (US); Brian D Silverman, Bellevue, WA (US)

(73) Assignee: Attachmate Corporation, Bellevue, WA (US)

( * ) Notice: Subject to any disclaimer, the term of this patent is extended or adjusted under 35 U.S.C. 154(b) by 1126 days.

(21) Appl. No.: 10/398,595

(22) PCT Filed: Oct. 3, 2001

(86) PCT No.: PCT/US01/31204

§ 371 (c)(1),
(2), (4) Date: Jul. 28, 2003

(87) PCT Pub. No.: WO02/29594

PCT Pub. Date: Apr. 11, 2002

(65) Prior Publication Data

US 2004/0034719 A1    Feb. 19, 2004

Related U.S. Application Data

(60) Provisional application No. 60/257,775, filed on Dec. 21, 2000, provisional application No. 60/237,953, filed on Oct. 3, 2000.

(51) Int. Cl.
*G06F 15/16* (2006.01)

(52) U.S. Cl. ............... 709/250; 709/217; 709/218; 709/219; 709/226; 709/246

(58) Field of Classification Search ............ 709/217, 709/218, 219, 223–226, 246
See application file for complete search history.

(56) References Cited

U.S. PATENT DOCUMENTS 5,758,341 A * 5/1998 Voss ................ 707/10
5,896,530 A * 4/1999 White .............. 718/102

* cited by examiner

Primary Examiner—Yves Dalencourt
(74) Attorney, Agent, or Firm—Seed IP Law Group PLLC

(57) ABSTRACT

A computer implemented internal area access communication system is used for communication between internal applications originating internal communication and running in an internal transaction area on a host computer and external applications originating external communication and running outside of the internal transaction area. Included are an external communication module to convert external communication having formats noncompliant with the internal transaction area, a virtual host terminal to run on the host computer and to execute virtual terminal functions associated with language of the external communication that is noncompliant with the internal transaction area and associated with language compliant with the internal transaction area. Also included is an access state controller to route the external and the internal communication based upon the tracked state information for the internal applications.

34 Claims, 34 Drawing Sheets

SYSTEM AND METHOD FOR COMMUNICATION WITH HOST INTERNAL AREA ACCESS

CROSS-REFERENCE TO RELATED APPLICATIONS

This application is a National Stage Application of International Application No. PCT/US01/31204, filed Oct. 3, 2001, which claims the benefit under 35 USC 119(e) of U.S. Provisional Patent Application No. 60/237,953, filed Oct. 3, 2000 and U.S. Provisional Patent Application No. 60/257,775, filed Dec. 21, 2000, where these provisional applications are incorporated by reference in their entirety

BACKGROUND OF THE INVENTION

1. Field of the Invention

The invention relates generally to computer applications, systems and methods, and more particularly to computer systems and methods to communicate with host internal area access systems including host bridges, bridge exits, and program exits.

2. Description of the Related Art

Some conventional legacy host computer systems include host internal area access systems such as host bridges, bridge exits, and program exits to allow communication with one or more internal application programs running in internal transaction areas of the legacy host computer systems. A host internal area access system allows for one or more cycle points of the internal application programs, which give control of the internal application programs to external applications including host and client applications and modules that run outside of the internal transaction areas. This control of the internal application programs allows users of the external applications to access internal application program data, which would otherwise typically be accessed through antiquated legacy application systems. In order to access the internal application programs through a host internal area access system, the external applications typically communicate in languages oriented toward the internal transaction area of the legacy host computer system.

For instance, for its Customer Information Control System (CICS), International Business Machines (IBM) provides a host internal area access system, CICS 3270 Bridge, which allows access into CICS applications from an IBM 3270 terminal perspective. In this case, users of external applications running outside of the CICS system must first develop interfaces to communicate with host internal area access systems, such as the CICS 3270 Bridge, that are written in languages oriented to the internal transaction area of the host, such as CICS.

Unfortunately, expertise in internal transaction areas, such as CICS, is highly sophisticated, which tends to discourage development of communication between external applications and internal applications through host internal area access systems such as the CICS 3270 Bridge. This expertise typically includes knowledge of older programming and assembly languages and data structures involved with such languages as COBOL, PL/1, 370 Assembler and other languages. The expertise also generally includes, but is not limited to, the internal architecture, pseudo-conversational transactions, and conversational transactions of the internal transaction area, associated quasi-reentrant programming models, asynchronously started transactions, and continuity of multiple instantiations of multiple internal applications to achieve some overall goal.

Additionally, host internal area access systems are not designed to service other external applications such as terminal emulation applications that emulate terminals unrelated to the internal transaction area of the host computer system. Since the host internal area access systems, such as the CICS 3270 Bridge, are oriented to particular native terminals compliant with the internal transaction area 108 (such as IBM CICS), such as the IBM 3270 terminal, the host internal area access systems are not designed to handle non-native terminal communication, such as non-3270 terminal communication that is non-compliant with the internal transaction area, which further limits the utility of the host internal area access systems.

Furthermore, host internal area access systems typically do not readily facilitate secured transactions such as when usernames and passwords are used. Consequently, those involved with external applications must develop workarounds to address requirements associated with secured transactions such as providing usernames and passwords. These workarounds tend only to be partially satisfactory. For instance, external applications have limited ability to communicate with the host internal area access systems regarding aspects related to secure transactions, which results in the external applications having no feedback as to whether the usernames and passwords, which are sent, are correct. In cases when usernames and passwords are incorrectly provided by the external applications, the secured transactions with the host internal area access systems fail without indication of the failure provided to the external applications. Herein are described computer based systems and methods directed toward these and other issues.

Other features and advantages of the invention will become apparent from the following detailed description, taken in conjunction with the accompanying drawings.

SUMMARY OF THE INVENTION

An internal area access communication system is configured for use with an internal transaction area and internal applications running in the internal transaction area on a host computer. The internal transaction area is configured to receive compliant communication. The internal applications are configured to communicate with a computer terminal compliant with the internal transaction area. The internal area access communication system is also configured for use with a host internal area access running on the host computer compliant with the internal transaction area and configured to provide access to the internal transaction area for external applications running outside of the internal transaction area.

Aspects of the internal area access communication system include an external communication module configured to receive external communication including a first external communication and a second external communication sent from the external applications. The first external communication is formatted in a first format and based on a non-compliant language that non-compliant with the internal transaction area. The second external communication is formatted in a second format compliant with the internal transaction area and based on a compliant language that is compliant with the internal transaction area. The external communication module is configured to convert the format of the first external communication from the first format into the second format. The external communication module is configured to receive internal communication originating from the internal applications having the second format. The external communication module is configured to convert, if needed, the format of the received internal communication from the second format into the first format, and configured to send the internal communication to the external applications based, at least in part, upon addressing of the internal communication.

Additional aspects include a virtual host terminal having a virtual display buffer, a virtual attributes buffer, and virtual terminal functions. The virtual host terminal is configured to receive the external communication, execute the virtual terminal functions, receive the internal communication, send communication in the second format and based on the compliant language to be received by the internal applications, and send communication in the second format and based upon the non-compliant language to be received by the external applications.

Additional aspects include an access state controller configured to track state information of the internal applications, and receive the external communication from the external communication module. The access state controller is also configured to send the external communication to at least one of the following: the virtual host terminal and the host internal area access, based upon addressing of the external communication and the state information. The access state controller is also configured to receive internal communication from the internal applications via the host internal area access, and send the internal communication to at least one of the following: the external communication module and the virtual host terminal based, at least in part, upon addressing of the internal communication and the state information. The access state controller is also configured to receive communication from the virtual host terminal, and send the communication to at least one of the following: the external communication module and the host internal area access virtual host terminal based, at least in part, upon addressing of the internal communication and the state information.

DETAILED DESCRIPTION OF THE INVENTION

Described herein are systems and methods for communication, via a host internal area access system, between internal applications running in an internal transaction area on a host computer system and external applications running in areas outside the internal transaction area. The communication systems and methods serve as exchanges using interfaces familiar to information systems departments, overseeing operation of the external applications, to mine data found in the internal applications, typically being legacy host computer applications. Simplification of the re-engineering process necessary to publish or reuse data and business logic behind legacy applications is a possible consequence.

Developers of the external applications are relieved from requirements for sophisticated expertise related to the internal transaction area imposed by other approaches. Even though the internal applications are originally designed for computer terminal communication, computer systems supporting the external applications can efficiently harvest data found on the internal applications through host internal area access compliant with the internal transaction areas while still using familiar interfaces without having to receive or translate computer terminal style communication, internal transaction area style communication, or host internal area access style communication.

In the following description, numerous specific details are provided to understand embodiments of the invention. One skilled in the relevant art, however, will recognize that the invention can be practiced without one or more of these specific details, or with other equivalent elements and components, etc. In other instances, well-known components and elements are not shown, or not described in detail, to avoid obscuring aspects of the invention or for brevity. In other instances, the invention may still be practiced if steps of the various methods described could be combined, added to, removed, or rearranged.

Figure 1:
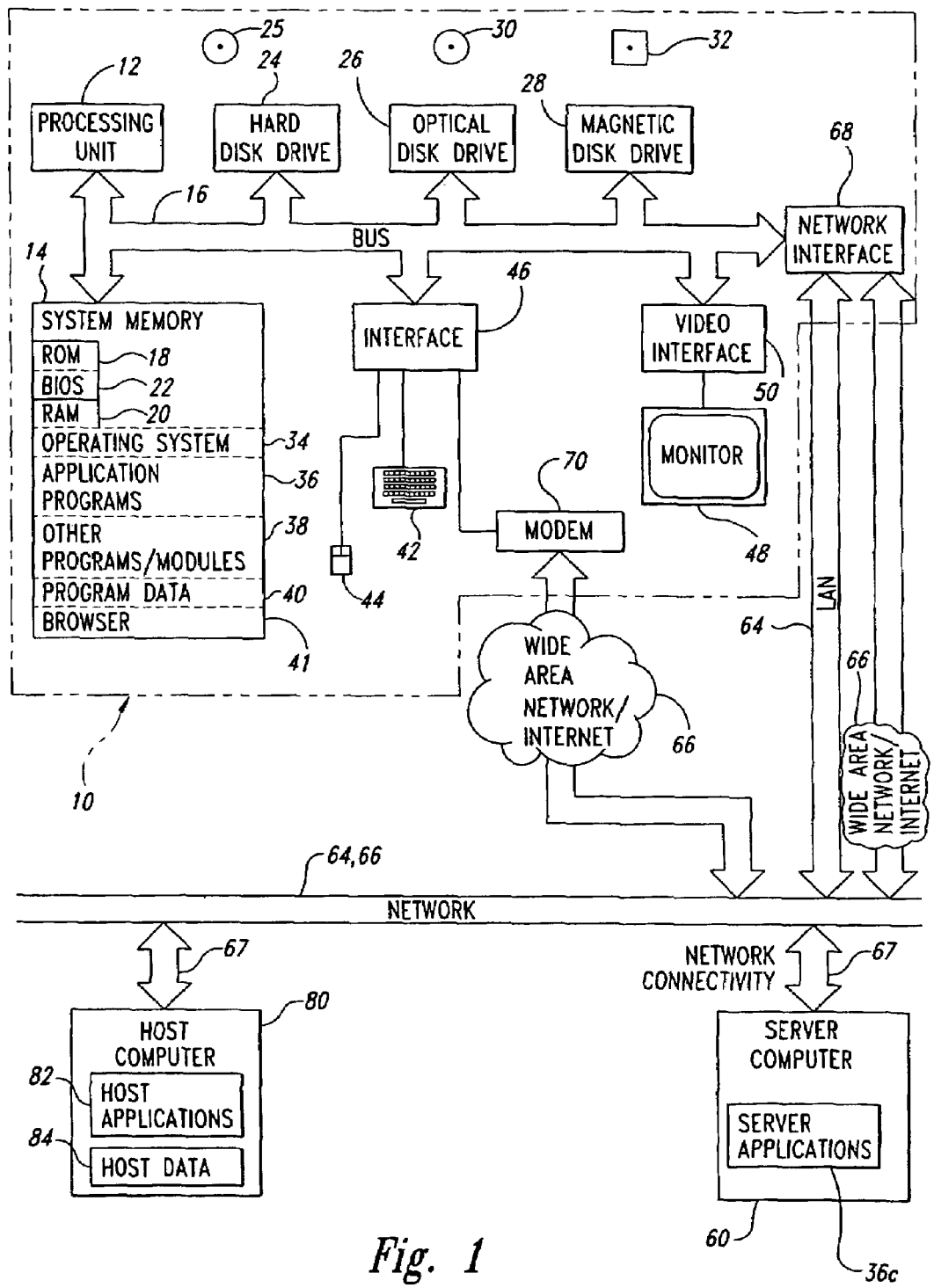
FIG. 1 is a schematic diagram of a computing system suitable for employing implementations described herein.

FIG. 1 and the following discussion provide a brief, general description of a suitable computing environment in which embodiments of the present invention can be implemented. Although not required, embodiments of the present invention will be described in the general context of computer-executable instructions, such as program application modules, objects, or macros being executed by a personal computer. Those skilled in the relevant art will appreciate that the invention can be practiced with other computer system configurations, including hand-held devices, multiprocessor systems, microprocessor-based or programmable consumer electronics, network PCs, mini computers, mainframe computers, and the like. The invention can be practiced in distributed computing environments where tasks or modules are performed by remote processing devices, which are linked through a communications network including wired and wireless environments. In a distributed computing environment, program modules may be located in both local and remote memory storage devices.

Referring to FIG. 1, a conventional personal computer, referred to herein as a client computer 10, includes a processing unit 12, a system memory 14 and a system bus 16 that couples various system components including the system memory to the processing unit. The client computer 10 will at times be referred to in the singular herein, but this is not intended to limited the application of the invention to a single client computer since in typical embodiments, there will be more than one client computer or other device involved. The processing unit 12 may be any logic processing unit, such as one or more central processing units (CPUs), digital signal processors (DSPs), application-specific integrated circuits (ASICs), etc. Unless described otherwise, the construction and operation of the various blocks shown in FIG. 1 are of conventional design. As a result, such blocks need not be described in further detail herein, as they will be understood by those skilled in the relevant art.

The system bus 16 can employ any known bus structures or architectures, including a memory bus with memory controller, a peripheral bus, and a local bus. The system memory 14 includes read-only memory ("ROM") 18 and random access memory ("RAM") 20. A basic input/output system ("BIOS") 22, which can form part of the ROM 18, contains basic routines that help transfer information between elements within the client computer 10, such as during start-up.

The client computer 10 also includes a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers (not shown) coupled between such drives and the bus 16, as is known by those skilled in the relevant art. The drives 24, 26 and 28, and their associated computer-readable media, provide nonvolatile storage of computer readable instructions, data structures, program modules and other data for the client computer 10. Although the depicted client computer 10 employs hard disk 25, optical disk 30 and magnetic disk 32, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 14, such as an operating system 34, one or more application programs 36, other programs or modules 38 and program data 40. The system memory 14 also includes a browser 41 for permitting the client computer 10 to access and exchange data with sources such as web sites of the Internet, corporate intranets, or other networks as described below, as well as other server applications on server computers such as those further discussed below. The browser 41 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the client computer 10 as a personal computer, in other embodiments, the client computer is some other computer related device such as a personal data assistant (PDA) or a cell phone or other mobile device.

While shown in FIG. 1 as being stored in the system memory 14, the operating system 34, application programs 36, other programs/modules 38, program data 40 and browser 41 can be stored on the hard disk 25 of the hard disk drive 24, the optical disk 30 of the optical disk drive 26 and/or the magnetic disk 32 of the magnetic disk drive 28. A user can enter commands and information into the client computer 10 through input devices such as a keyboard 42 and a pointing device such as a mouse 44. Other input devices can include a microphone, joystick, game pad, scanner, etc. These and other input devices are connected to the processing unit 12 through an interface 46 such as a serial port interface that couples to the bus 16, although other interfaces such as a parallel port, a game port or a wireless interface or a universal serial bus ("USB") can be used. A monitor 48 or other display device is coupled to the bus 16 via a video interface 50, such as a video adapter. The client computer 10 can include other output devices, such as speakers, printers, etc.

The client computer 10 can operate in a networked environment using logical connections to one or more remote computers, such as a server computer 60. The server computer 60 can be another personal computer, a server, another type of computer, or a collection of more than one computer communicatively linked together and typically includes many or all of the elements described above for the client computer 10. The server computer 60 is logically connected to one or more of the client computers 10 under any known method of permitting computers to communicate, such as through a local area network ("LAN") 64, or a wide area network ("WAN") or the Internet 66 wherein the server computer 60 is communicatively linked by a conventional network connectivity 67. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a LAN networking environment, the client computer 10 is connected to the LAN 64 through an adapter or network interface 68 (communicatively linked to the bus 16). When used in a WAN networking environment, the client computer 10 often includes a modem 70 or other device, such as the network interface 68, for establishing communications over the WAN/Internet 66. The modem 70 is shown in FIG. 1 as communicatively linked between the interface 46 and the WAN/Internet 66. In a networked environment, program modules, application programs, or data, or portions thereof, can be stored in the server computer 60. In the depicted embodiment, the client computer 10 is communicatively linked to the server computer 60 through the LAN 64 or the WAN/Internet 66 with TCP/IP middle layer network protocols; however, other similar network protocol layers are used in other embodiments. Those skilled in the relevant art will readily recognize that the network connections shown in FIG. 1 are only some examples of establishing communication links between computers, and other links may be used, including wireless links.

In some embodiments, the server computer 60 is further communicatively linked to a legacy host data system 80 typically through the LAN 64 or the WAN/Internet 66 or other networking configuration such as a direct asynchronous connection (not shown) wherein the legacy host data system 80 is communicatively linked by the network connectivity 67. With other embodiments, the client computer 10 is further communicatively linked (not shown) to the legacy host data system 80 typically through the LAN 64 or the WAN/Internet 66 or other networking configuration such as a direct asynchronous connection. Other embodiments may support the server computer 60 and the legacy host data system 80 by one computer system by operating all server applications and legacy host data system on the one computer system. The legacy host data system 80 in an exemplary embodiment is an International Business Machines (IBM) 390 mainframe computer configured to support IBM 3270 type terminals. Other exemplary embodiments use other vintage host computers such as IBM AS/400 series computers, UNISYS Corporation host computers, Digital Equipment Corporation VAX host computers and VT/Asynchronous host computers as the legacy host data system 80. The legacy host data system 80 is configured to run host applications 82 such as in system memory and store host data 84 such as business related data.

An exemplary embodiment of the invention is implemented in the Sun Microsystems Java programming language to take advantage of, among other things, the cross-platform capabilities found with the Java language. For instance, exemplary embodiments include the server computer 60 running Windows NT, Win2000, Solaris, Apple MacIntosh OS (e.g. 9.x or X) or Linux operating systems. In exemplary embodiments, the server computer 60 runs Apache Tomcat/Tomcat Jakarta web server or Microsoft Internet Information Server (ISS) web server, or BEA Weblogic web server.

Apache is a freely available Web server that is distributed under an "open source" license and runs on most UNIX-based operating systems (such as Linux, Solaris, Digital UNIX, and AIX), on other UNIX/POSIX-derived systems (such as Rhapsody, BeOs, and BS2000/OSD), on AmigaOS, and on Windows 2000/NT/95/98/ME. Windows-based systems with Web servers from companies such as Microsoft and Netscape are alternatives, but Apache web server seems suited for enterprises and server locations (such as universities) where UNIX-based systems are prevalent. Other embodiments use other web servers and programming languages such as C, C++, and C#.

Figure 2:
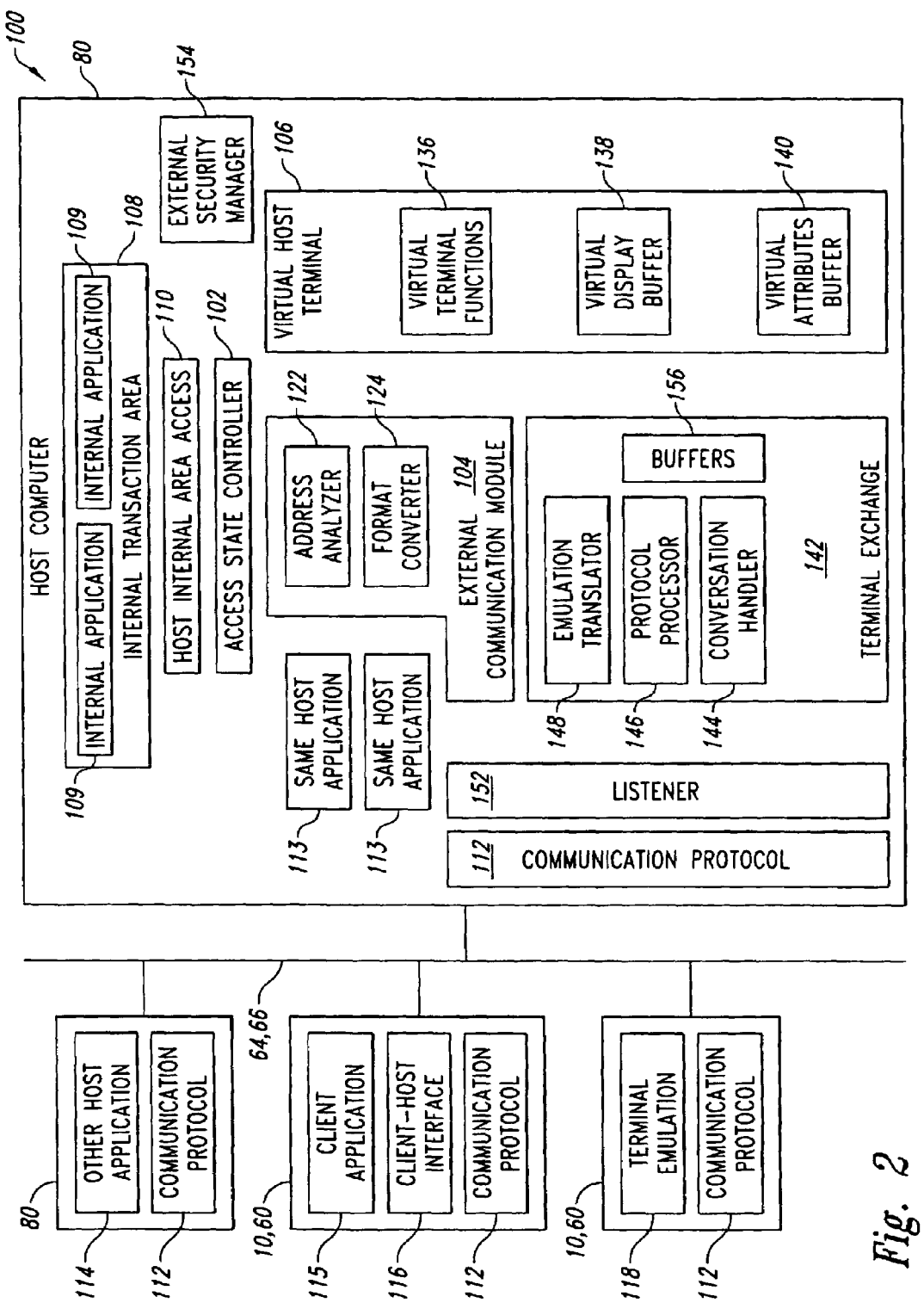
FIG. 2 is a schematic diagram illustrating and implementation of a communication system to facilitate communication between external applications and a host internal area access.

An internal area access communication system 100 is illustrated in FIG. 2 as running on the legacy host data system 80. Included on the legacy host data system 80 of the internal area access communication system 100 is an access state controller 102, an external communication module 104, a virtual host terminal 106, an internal transaction area 108 where one or more internal applications 109 are being run, a host internal area access 110, and a communication protocol 112. The internal area access communication system 100 is connected by a network such as the LAN 64 or WAN/Internet 66 to other legacy host data systems 80, and/or the client computers 10 and/or the server computers 60. As illustrated in FIG. 2, one or more same host applications 113 can be running on the legacy host data system 80 of the internal area access communication system 100 outside of the internal transaction area 108. An example of the same host application 113 is a program running in a different IBM CICS region than an IBM CICS region that is used as the internal transaction area 108 where the legacy host data system 80 is running an IBM OS 390 operating system. In this example, the same host application 113 can use a distributed program link (DPL) to communicate with internal applications 109 via the external communication module 104, the access state controller 102, and the host internal area access 110 resulting in multi-region operation calls. Similarly, other program-to-program communication between the same host applications 113 and the internal applications 109 are found in other implementations. Also, another host application 114 can be running on another of the legacy host data systems 80 networked to the internal area access communication system 100 and communicating via the communication protocol 112. An example of one of the other host applications 114 is a program running on another machine such as another one of the legacy host data system 80, as shown in FIG. 2, or one of the client computers 10, such as a personal computer. In one exemplary implementation, the other host application 114 communicates with one or more of the internal applications 109 using an IBM external CSCI interface (ECI) wherein the internal transaction area 108 is an IBM CICS.

One or more of the client computers 10 and/or the server computers 60 can be running a client application 115 in conjunction with a client-host interface 116 to be communicating with the internal area access communication system 100 via the communication protocol 112. The client-host interface 116 is typically an application program interface (API) written in the perspective of a high-level language such as HLLAPI, SEACL, etc. to indicate, for instance, row and column of a computer terminal of the type of the virtual host terminal 106 from or into which data is to be extracted or placed. In addition, one or more of the client computers 10 and/or the server computers 60 can be running a terminal emulation 118 to be communicating with the internal area access communication system 100 via the communication protocol 112.

The internal area access communication system 100 allows for communication between one or more of the same host applications 113, the other host applications 114, the client applications 115, and the terminal emulations 118, collectively known as external applications, and one or more of the internal applications 109 running in the internal transaction area 108. Communication between the internal applications 109 and external applications are via the host internal area access 110 without burdening the developers and users of the external applications by requiring them to know about the languages and data structures involved with the internal transaction area 108, in contrast with conventional approaches.

The access state controller 102 controls invocation of the host internal area access 110 across multiple internal applications 109 and maintains in-transaction and out-of-transaction states necessary to satisfy the host internal area access, the internal transaction area 108, and other areas of the legacy host data system 80 of the internal area access communication system 100. The access state controller 102 maintains the state of the host internal area access 110, the virtual host terminal 106, and interface components of the external applications while only requiring the external applications to maintain transactions through conventional screen-scraping interfaces and other mechanisms familiar with developers of the external applications. Furthermore, the access state controller 102 analyzes addresses of received external communication from the external applications with respect to state information of associated internal applications 109 running in the designated internal transaction area 108. Based upon this analysis, the access state controller 102 sends external communication from the external applications either in a format compliant with the internal transaction area 108 to one of the internal applications 109 in the internal transaction area 108 via a host internal area access 110 or to a virtual host terminal 106 also running on the same legacy host data system 80 of the internal transaction area.

The external communication module 104, running on the legacy host data system 80 outside of the internal transaction area 108, is designed to receive from the external applications, standardized high-level language based communication rather than computer terminal communication expected by the internal applications 109. The high-level languages include, but are not limited to, High-Level Language Application Programming Interface (HLLAPI), Server Enterprise Class Library (SEACL), Host Publishing Interfaces such as QACOM (the Microsoft Windows COM based set of HLLAPI style interfaces), the OHIO specification (created jointly between IBM Corp. and Attachmate Corp., Bellevue, Wash.), various playback/record interfaces conventionally known as navigation, macros, and/or scripting.

The external communication module 104 is also designed to receive from the external applications, such as the same host application 113, and the other host application 114, direct binary communication compliant with the particular internal transaction area 108, such as IBM CICS or one related to IBM AS/400 or UNISYS operating systems, on the legacy host data system 80 running the internal applications 109. The external communication module 104 has an address analyzer 122 that routes received external communication from the external applications to the proper access state controller 102 or other appropriate processes. The external communication module 108 also has a format converter 124, which converts external communication received from the external applications that is not in binary form compliant with the internal transaction area 108, such as markup languages including XML and HTML and other forms using protocols such as including HTTP. If needed, the format converter 124 converts received external communication into binary formatted data compliant with the internal transaction area 108. The external communication module 104 also receives internal communication from the internal applications 109 operating in the internal transaction area 108 and routes the internal communication either to the virtual host terminal 106 or directly to external applications if the functions of the virtual host terminal are not needed to pass on the particular internal communication.

The virtual host terminal 106 reflects what a computer terminal handling communication compliant with the internal transaction area 108 would display when operating on a network. The virtual host terminal 106 includes virtual terminal functions 136, a virtual display buffer 138, and a virtual attributes buffer 140. Memory buffers, such as the virtual attributes buffer 140, and the virtual display buffer 138, and the virtual terminal functions 136 are incorporated in the virtual host terminal 106 to simulate a computer terminal connected to a network (e.g. using IBM VTAM and SNA protocols) with the legacy host data system 80. When the external applications are configured to receive terminal data associated with terminals of the style implemented in the virtual host terminal 106, then during the initial connect time with the external application, the particular model of terminal is determined with which the external application is configured to communicate so that the display buffer 138 and the attributes buffer 140 can be configured accordingly. For instance, the size of the display buffer 138 and the attributes buffer 140 reflects whether screen size of the model is 24×80, 32×127, etc. The virtual host terminal 106, acting in conjunction with the external communication module 104 and the access state controller 102, serves as a communication liaison between the internal applications 109 via the host internal area access 110 and the external applications.

The virtual host terminal 106 is designed to handle, through the use of the its virtual terminal functions 136, communication from the access state controller 102 in a high-level style language as well as internal transaction area style language both in a binary data format compliant with the internal transaction area 108. The virtual host terminal 106, through the use of the virtual display buffer 138 and the virtual attributes buffer 140, also manages communication data including those that control data presentation and data status such as whether the data is protected, unprotected, or modified. As an example, if one of the external applications sends an instruction, such as a keystroke, to modify data regarding a terminal character or display attribute, the data is first updated in the virtual display buffer 138 and the virtual attributes buffer 140 of the virtual host terminal 106.

If required, such as typically when an AID key is sent, the data is formatted suitably for the host internal area access 110 via the access state controller 102 to exchange the user's sent data with one or more of the internal applications 109.

Conventional approaches use network based display and attribute buffers that are reflected out on a client computer or a mid-tier computer. These conventional approaches result in arduous communication between the external applications and the internal applications since each terminal screen as part of a navigation transition through a legacy host internal application must be sent across the network from the legacy host data system to the client computer running on the external application.

For instance, if the external application needed to transition through two terminal screens on an internal application to get to a third screen of an internal application to extract some desired data, conventional approaches would first send the first terminal screen from the internal application across the network to the external application where the external application would send a first command with respect to the first terminal screen back across the network to the internal application. After receiving the first command, the internal application would then send a second terminal screen across the network to the external application, which would then send a second command back across the network to the internal application. After receiving the second command, the internal application would then send the third terminal screen across the network to the external application whereby the external application would extract desired data from the third terminal screen.

In contrast to these conventional approaches, the virtual host terminal 106 could interact with the internal application 109 through the first, second, and third terminal screens whereby the virtual host terminal could extract desired data from the third terminal screen and then send only the desired data across the network to the external application. Since only the desired data would be sent across the network rather than the interim first, second, and third terminal screens, a resultant savings of time and reduction of network traffic has been observed in comparison tests.

The exemplary implementation shown in FIG. 2 has a terminal exchange 142, which includes a conversation handler 144, a protocol processor 146, an emulation translator 148, and buffers 156. In general the terminal exchange 142 identifies the terminal type of the requesting terminal emulation 118 from its socket conversation, maps the buffer of the requesting terminal emulation, and translates requests to and responses from the external communication module 104. The external communication module 104, as discussed, works with other components of the internal area access communication system 100 within the particular terminal perspective of the host internal area access 110 and the internal transaction area 108. The terminal exchange 142 receives external communication originating from the terminal emulation 118 as terminal emulators non-compliant with the internal transaction area 108, translates the external communication into a terminal format compliant with the internal transaction area 108, and then sends the external communication on to the external communication module 104. In turn, the external communication module 104 routes the external communication originating from the non-compliant terminal emulator on to the access state controller 102, which sends the external communication on to either the host internal area access 110 or the virtual host terminal 106. As a result, the terminal exchange 142 provides access for the terminal emulation 118 as a non-compliant terminal emulator to the host internal area access 110 such that the terminal emulation 118 can communicate directly to internal applications 109 running in the internal transaction area 108 without experiencing delays caused by other approaches.

The exemplary implementation of FIG. 2 also has a listener 152, which listens for initial connect messages from the external applications and helps establish transaction links between the external applications and the external communication module 104 and/or the terminal exchange 142. When a listener 152 determines that the external application is one of the terminal emulations 118 that has a different terminal type than the terminal type of the virtual host terminal 106, the listener passes off communication to the conversation handler 144 of the terminal exchange 142.

The conversation handler 144 accepts socket conversations from the listener 152 and handles communication with the terminal emulation 118 in the protocol of the terminal emulation. The protocol processor 146 parses the packet data sent from the terminal emulation 118, identifies the protocol used by the terminal emulation, and sets up one or more of the buffers 156 as needed for emulation translation. The emulation translator 148 converts the terminal protocol from the terminal emulation 118 into a terminal protocol acceptable by the external communication module 104, namely the terminal protocol native to the virtual host terminal 106 and the internal transaction area 108.

Examples of terminals implemented by the virtual host terminal 106 include IBM 3270, 5250, TN3270, and TN5250 terminals. Other implementations of the virtual host terminal 106 include Digital Equipment Corp., VT terminal series such as VT100 and VT220. Whatever is chosen for the virtual host terminal 106 is done so with respect to the native terminal compliant with the internal transaction area 108. Implementations of the terminal exchange 142 are configured to translate terminal communication using terminal protocols other than those used by the virtual host terminal 106. In some implementations, the terminal communication can involve wireless devices such as those using WML markup language protocols. The operational terminal control set of terminals not native to the internal transaction area 108 can be mapped or translated into and out from all or a subset of a collection of terminal control orders that in some implementations include outbound commands, such as clear screen buffer, set buffer address, start field, start field extended, attributes, and extended attributes, and inbound commands, such as enter, PA1-PA3, PF1-PF24, clear, light pen, magnetic slot reader, reset, and power on reset. Also, the terminal exchange 142 may also handle communication from the terminal emulation 118 although the emulation translator 148 will not have to translate the terminal emulation protocols originating from the terminal emulation.

Internal communication from the internal applications 109 is in a form compliant with both the internal transaction area 108 and the virtual host terminal 106. When the internal communication is destined for the terminal emulation 118, the internal communication is translated by the emulation translator 148 of the terminal exchange 142 back into the terminal protocol of the originating terminal emulation 118. The protocol processor 146 then packages the translated internal communication using appropriate emulation protocols of the terminal emulation 118. The conversation handler 144 then attaches network protocol information to the translated internal communication to send the translated internal communication to the terminal emulation 118 over lower layer network protocols such as IPX, TCP/IP, or GAP (generalized access protocol or gateway access protocol), or asynchronous telephone via a communication network such as the WAN 64 or the LAN/Internet 66 or other communication network. The conversation handler 144 also handles the actual network conversation with the client computer 10 or the server computer 60 the terminal emulation 118.

Through use of the terminal exchange 142, terminal emulation processes can bypass proprietary network communication systems (such as IBM VTAM/SNA) dedicated to certain internal transaction areas (such as IBM CICS) and route communication directly between the internal applications 109 and the terminal emulation 118 over standardized communication data networks. Both the terminal emulation 118 and the internal applications 109 are abstracted from one another thereby leaving them free to run in their own communication perspective. Through the terminal exchange 142, terminal data from internal applications 109 can be formatted using terminal protocols other than the one associated with the terminal compliant with the internal transaction area 108. This type of formatting into terminal protocols not compliant with the internal transaction area 108 can be faster using the internal area access communication system 100 than other approaches because the terminal data from internal applications 109 is not first formatted completely into the compliant terminal protocol, which is the case with other approaches.

The operational combination of the access state controller 102, the external communication module 104, and the virtual host terminal 106 results in communication, through the host internal area access 110, between external applications running outside the internal transaction area 108 and internal applications 109 running in the internal transaction area. Communication is provided without users of the external applications requiring expertise directed toward the host internal area access 110 and the internal transaction area 108, such as with programming languages, architectures, data structures, assembly languages, and other aspects. Examples of such expertise involves IBM CICS, IBM 3270 Bridge Exit, IBM CICS Formatted External Programming Interface (FEPI), or whatever mainframe integration technology developers of the external applications used to drive their legacy mainframe internal applications.

Other possible consequences include decreased response times due in part to communication traffic between the internal applications 109 and the external applications being partially replaced by communication traffic between the internal applications and the virtual host terminal 106, or the external applications and the virtual host terminal. In effect, an offloading of communication traffic from communication networks, such as the LAN 64 and the WAN/Internet 66, to within the legacy host data system 80 containing the internal applications 109 is possible.

Figure 3:
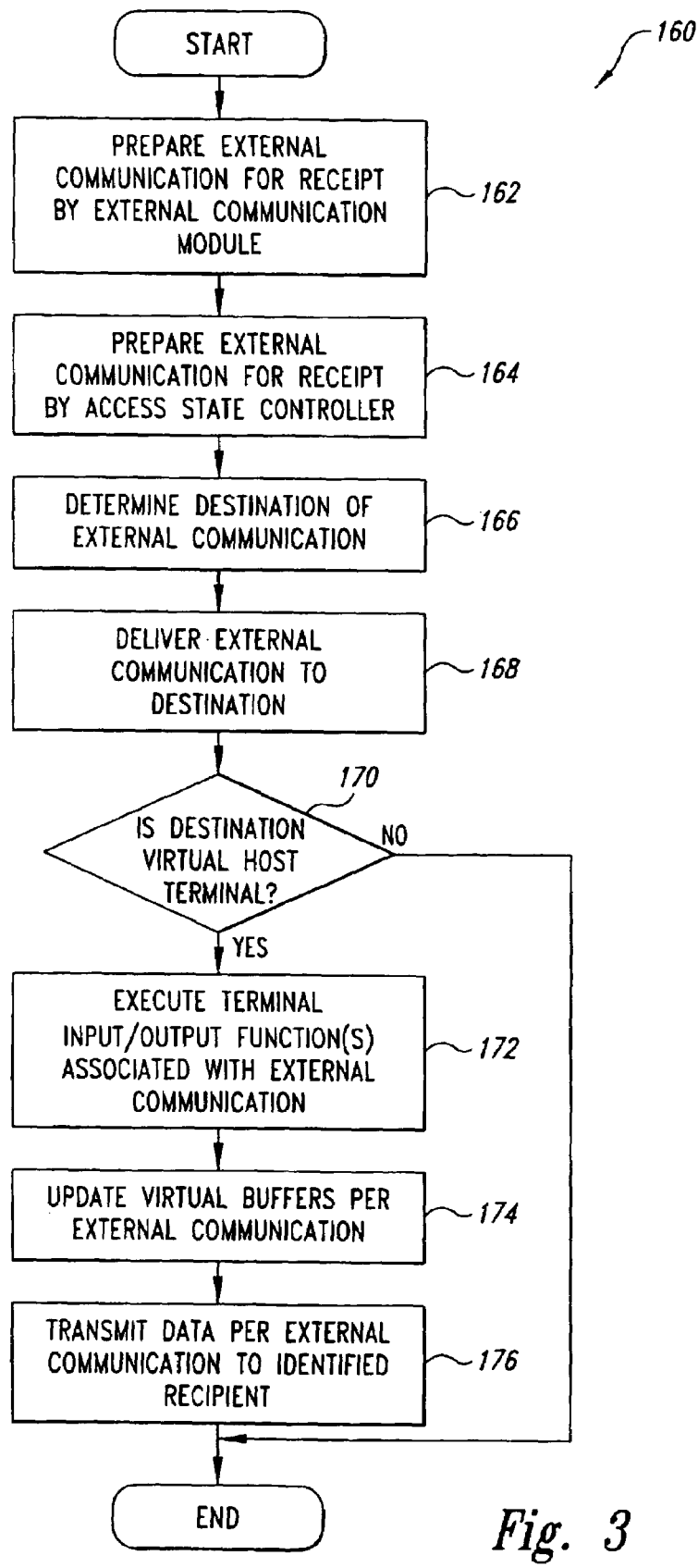
FIG. 3 is a flowchart illustrating a method implemented by the communication system, as illustrated in FIG. 2, for processing an external communication sent from an external application.

An illustration of a method 160 associated with the internal area access communication system 100 interacting with an external communication is provided by FIG. 3. Once an external communication is sent by one of the external applications, the external communication is prepared for receipt by the external communication module 104. If the external communication originates from one of the same host applications 113, one of the other host applications 114, or one of the client applications 115, the external application is generally sent through the communication protocol 112 directly to the external communication module 104 after being received by the legacy host data system 80 hosting the internal transaction area communication system 100. If the external communication originates from the terminal emulation 118, the external communication is sent through the communication protocol 112 to the terminal exchange 142 for any necessary emulation translation before being sent on to the external communication module 104.

After being received by the external communication module 104, external communication is prepared for receipt by the access state controller 102 (step 162). If the external communication has been formatted in higher-level languages, such as markup languages, the format converter 124 of the external communication module 104 converts the external communication into a binary form associated with the internal transaction area 108, the access state controller 102, the host internal area access 110, and the virtual host terminal 106 (step 164). The address analyzer 122 of the external communication module 104 analyzes the address of the external communication before sending it on to the access state controller 102 to help identify the purpose and destination of the external communication. The access state controller 102 further analyzes the external communication to determine its destination (step 166) and delivers the external communication to its destination (step 168). If the destination of the external communication is not the virtual host terminal 106 (NO branch of decision step 170), then the external communication is delivered to the host internal area access 110 to be sent on to one of the internal applications 109 running in the internal transaction area 108. Otherwise (YES branch of decision step 170), the external communication is sent on to the virtual host terminal 106 where one or more of the functions of the virtual host terminal are executed with respect to the external communication (step 172). During execution of the appropriate functions, the virtual host terminal 106 updates the virtual display buffer 138 and the virtual attributes buffer 140 (step 174). Depending on which functions are executed, the virtual host terminal 106 then transmits data according to the objective of the external communication via the access state controller 102 to either the internal transaction area 108 through the host internal area access 110 or to one of the external applications through the external communication module 104 (step 176). The method 160 then returns to the caller or ends.

Figure 4:
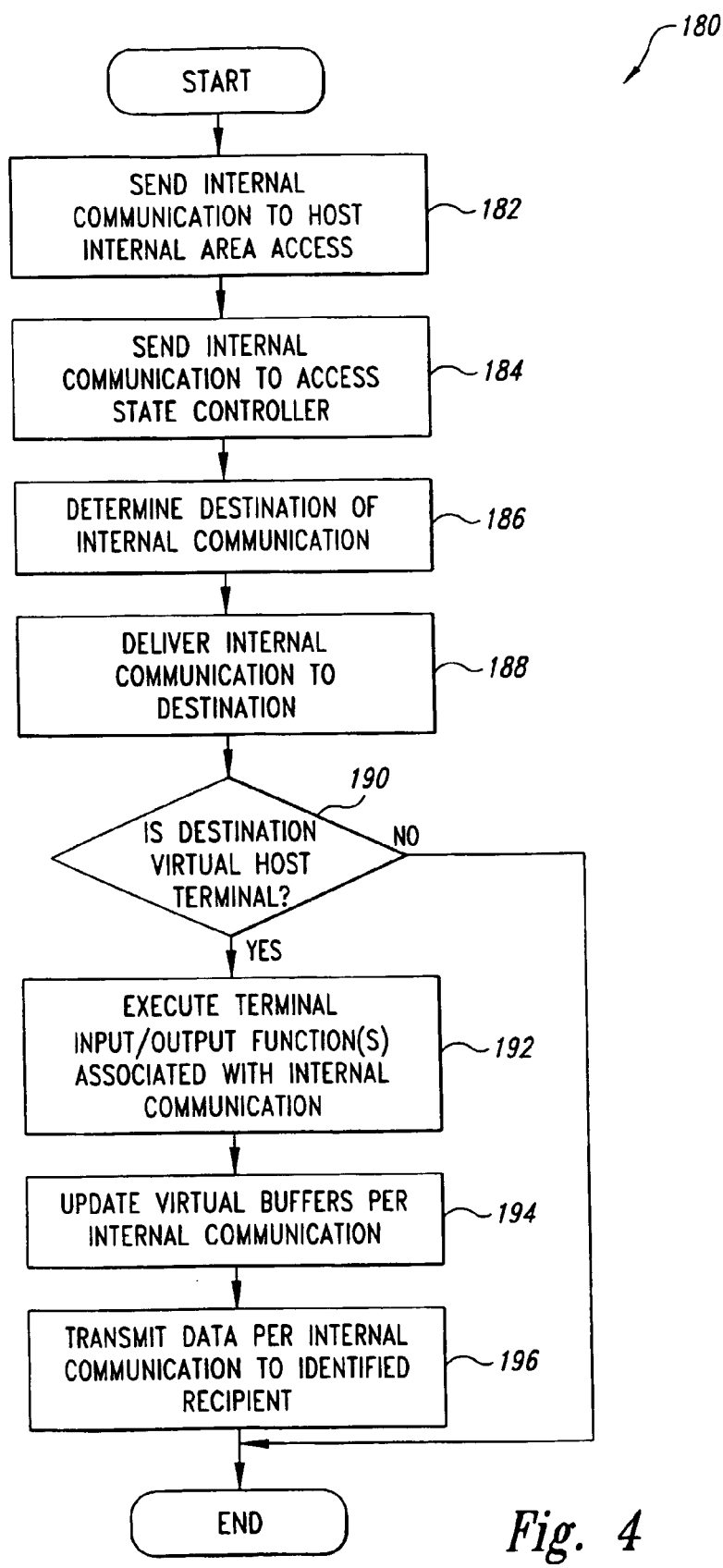
FIG. 4 is a flowchart illustrating a method implemented by the communication system, as illustrated in FIG. 2, for processing an internal communication sent by an internal application.

An illustration of a method 180 associated with the internal area access communication system 100 interacting with an internal communication is provided by FIG. 4. In this example, an internal communication is sent by one of the internal applications 109 to the host internal area access 110 (step 182). Given the addressing of the internal communication, the host internal area access 110 then sends the internal communication to the access state controller 102 (step 184). The access state controller 102 determines the destination of the internal communication based upon such factors as the addressing the internal communication and state data contained by the access state controller (step 186). If the destination of the internal communication is not the virtual host terminal 106 (NO branch of decision step 190), then the internal communication is sent on to one of the external applications through the external communication module 104 and if needed, through the terminal exchange 142. Otherwise (YES branch of decision step 190), the internal communication is sent to the virtual host terminal 106 where one or more of the functions of the virtual host terminal are executed with respect to the internal communication (step 192). During execution of the appropriate functions, the virtual host terminal 106 updates the virtual display buffer 138 and the virtual attributes buffer 140 (step 194). Depending on which functions are executed, the virtual host terminal 106 then transmits data according to the objective of the internal communication via the access state controller 102 to either the internal transaction area 108 through the host internal area access 110 or to one of the external applications through the external communication module 104 and if needed, the terminal exchange 142 (step 196). The method 180 return to the caller or ends.

As discussed, the virtual host terminal 106 is configured to accept commands and other instructions from the internal applications in their high-level languages, such as HLLAPI or SEACL, and in response, to execute terminal functions in a manner consistent with the host terminal compliant with the internal transaction area 108. In an exemplary implementation, the virtual host terminal 106 is configured to accept SEACL and/or HLLAPI instructions from the external applications, communicate, as an IBM 3270 terminal, with the internal transaction area 108 being an IBM CICS, and respond to the external applications in their high-level SEACL and/or HLLAPI language. Flowcharts illustrating exemplary implementations of high-level language functions and internal transaction area communication functions for the virtual host terminal 106 follow.

In some of these exemplary implementations, draw orders come from the internal transaction area 108 in a form of basic mapping support (BMS), which originally is used to inform Virtual Telecommunications Access Method (VTAM) how to send corresponding SNA data for desired terminal display. In these cases, the virtual host terminal 106 applies rules of the BMS map from its binary form and renders the data as if drawing directly into the virtual display buffer 138. The BMS oriented data is compressed so that the virtual host terminal 106 must expand it as it would appear on the network after passing through its associated BMS map. To expand the BMS data, the virtual host terminal 106 applies the BMS map and renders the data to draw it directly into the virtual display buffer 138 at the desired row and column intended by the CICS application. This drawing of the BMS data into the virtual display buffer 138 is done to prepare for a subsequent request by the external application.

In other exemplary implementations, draw orders in the form of a stream of raw binary data come from the internal application 109 to the virtual host terminal 106, which uses received buffer address commands to handle positioning of the cursor to draw the data into the virtual display buffer 138. The virtual host terminal 106 parses the raw terminal data with its embedded orders and puts the data into the virtual display buffer 138 in the virtual attributes buffer 140 to achieve a result similar to processing the BMS data.

Figure 5A:
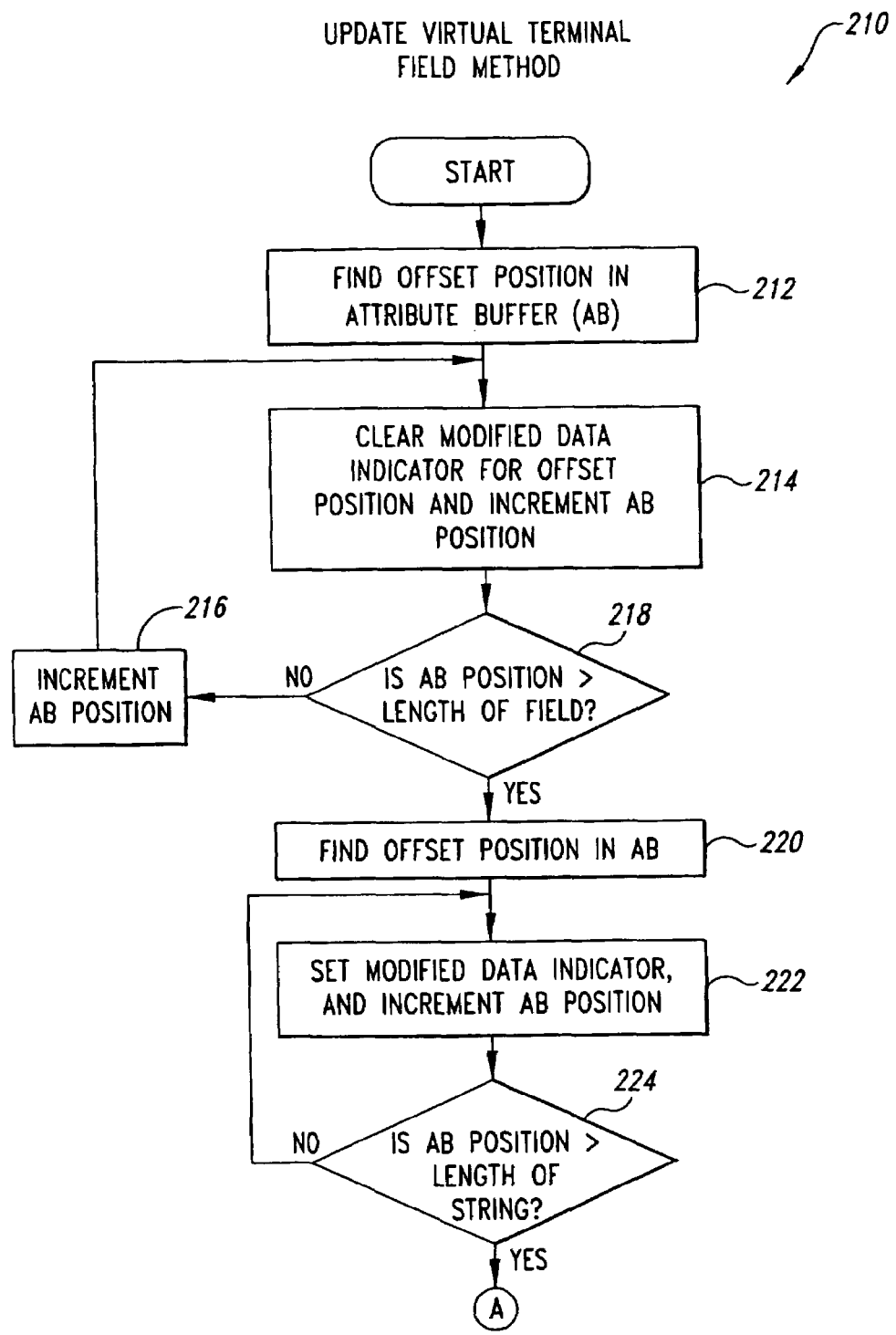
FIGS. 5A and 5B combine to describe a flowchart illustrating a method implemented by the communication system, as illustrated in FIG. 2, to update a virtual terminal field.
Figure 5B:
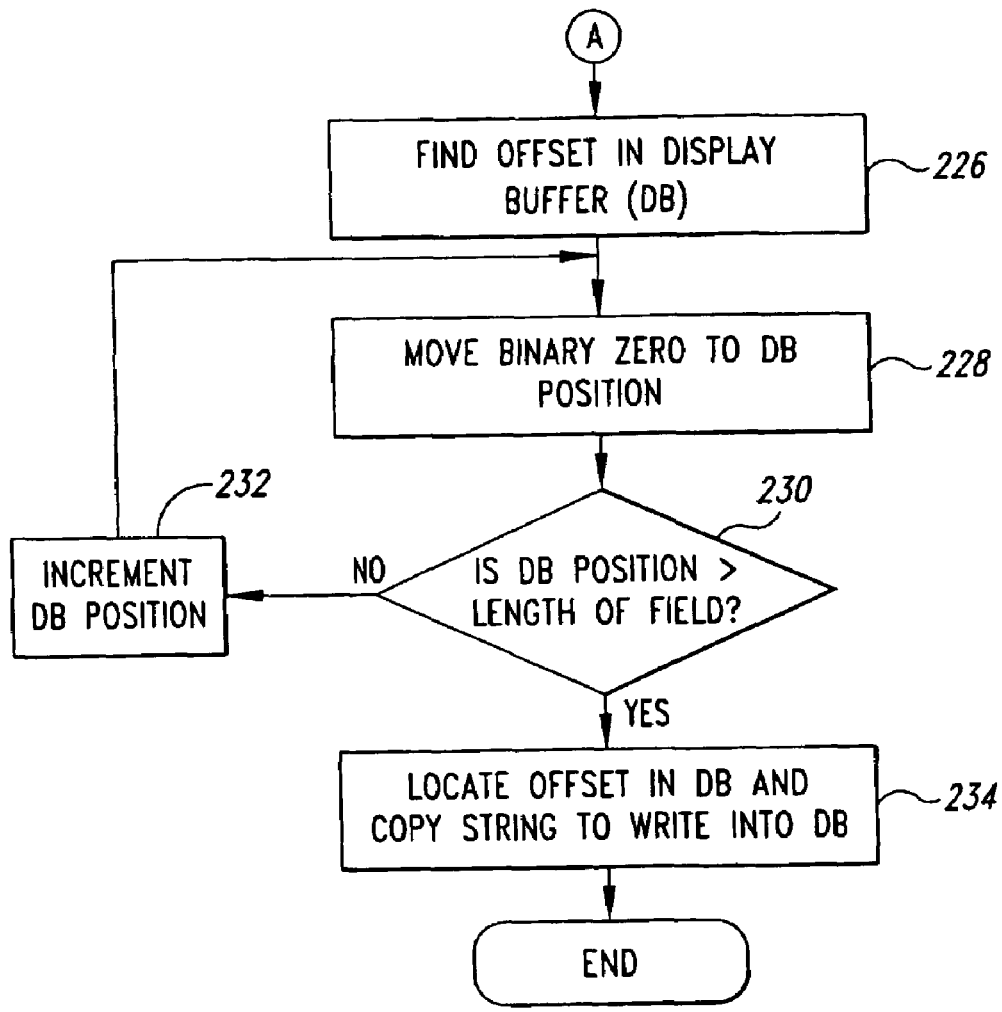

An illustration of a method 210 of a representative implementation of an exemplary function of the virtual host terminal 106 to perform field updates in the virtual display buffer 138 and the virtual attributes buffer 140 is shown in FIGS. 5A and 5B. The method 210 sets a given position in the virtual host terminal 106 to a given text string passed to the virtual host terminal and adds appropriate padding to specified lengths. The method 210 first finds the appropriate offset position in the virtual attributes buffer 140 (step 212). The method then clears a modified data indicator for the found offset position and then increments a pointer to a new current position within the virtual attributes buffer 140 (step 214). If the new current position is not greater than the length of the associated field being updated (NO branch of decision step 218), the method 210 increments the pointer to a new current position within the virtual attributes buffer 140 (step 216). Otherwise (YES branch of decision step 218), the method 210 finds an additional offset position in the virtual attributes buffer 140 (step 220). The modified data indicator is then set and the pointer is further incremented to a new current position within the virtual attributes buffer 140 (step 222). If the new current position within the virtual attributes buffer 140 is not greater than the length of an associated string, then the method 210 goes back to repeat step 222 (NO branch of decision step 224). Otherwise (YES branch of decision step 224), the an offset position in the virtual display buffer 138 is found and set as the current position in the virtual display buffer (step 226). A binary value, such as binary zero, is moved to the current position in the virtually display buffer 138 (step 228). If the current position in the virtual display buffer 138 is not greater than the length of the associated field (NO branch of decision step 230), then the current position in the virtual display buffer is incremented (step 232). Otherwise (YES branch of decision step 230), an offset in the virtual display buffer 138 is located and an associated string is copied and written into the current position of the virtual display buffer (step 234). The method 210 then returns to the caller or ends.

Figure 6:
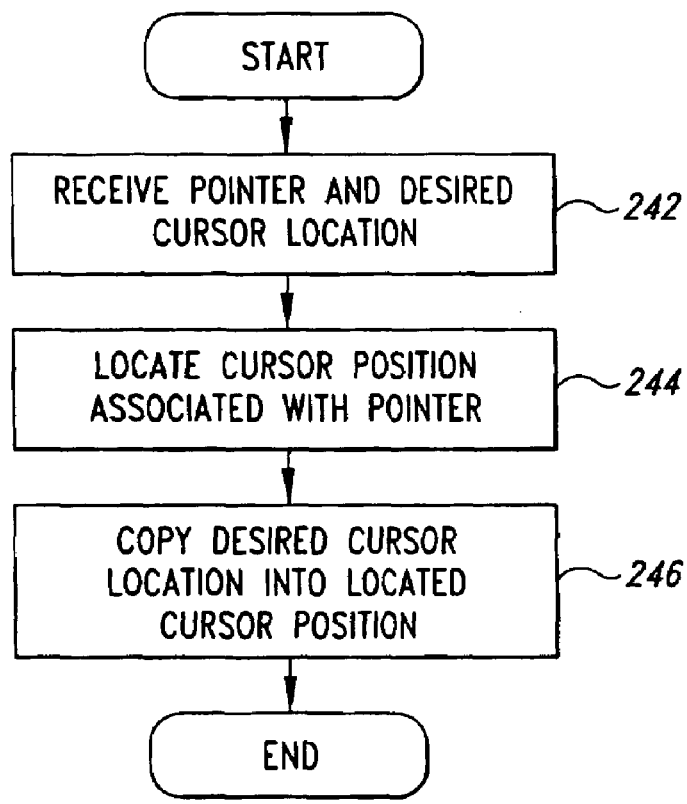
FIG. 6 is a flowchart illustrating a method implemented by the communication system, as illustrated in FIG. 2, to set a virtual terminal cursor position.

An illustration of a method 240 of a representative implementation of an exemplary function of the virtual host terminal 106 to set cursor position of the virtual host terminal 106 is shown in FIG. 6. The method 240 first receives pointer and desired cursor location information (step 242). The desired cursor position is then located and associated with a pointer (step 244). The method 240 then copies the desired cursor location into the located cursor position (step 246). The method 240 then returns to the caller or ends.

Figure 7:
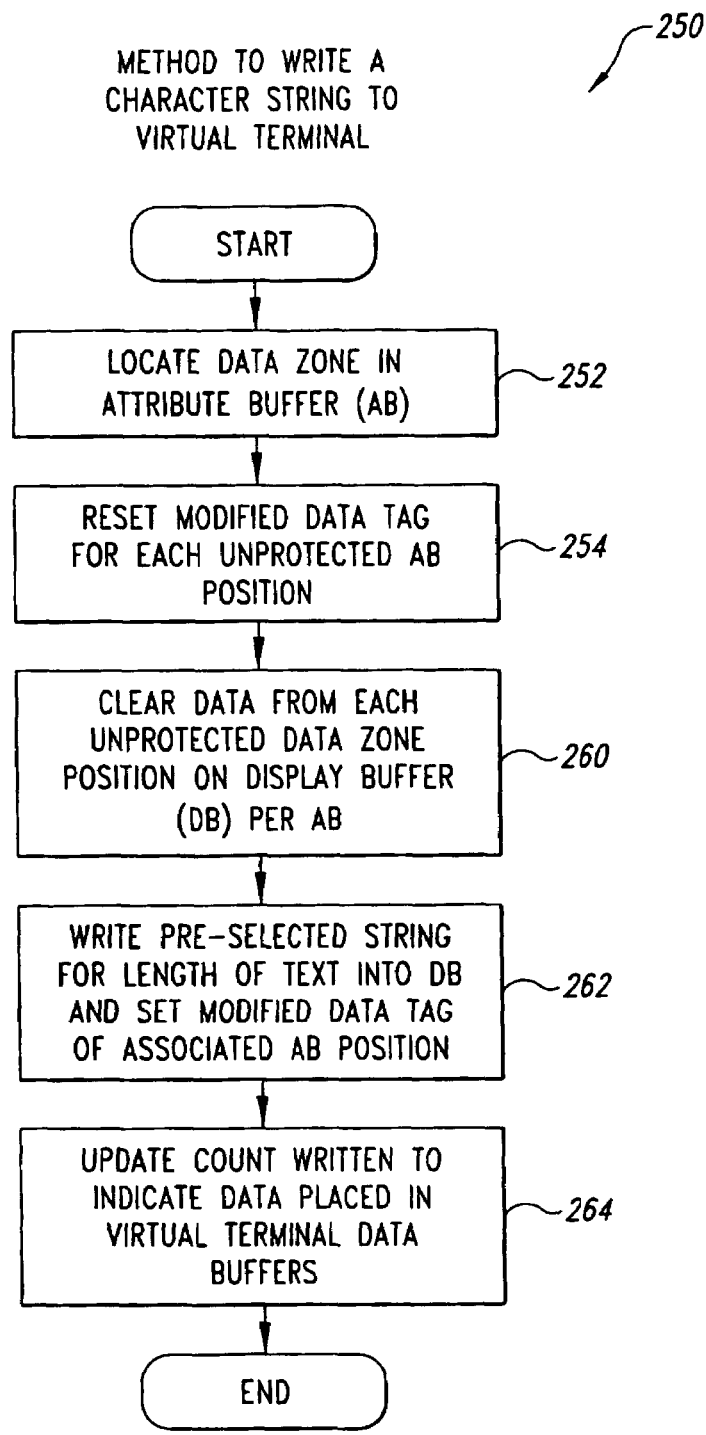
FIG. 7 is a flowchart illustrating a method implemented by the communication system as illustrated in FIG. 2, to write a character string to a virtual terminal.

An illustration of a method 250 of a representative implementation of an exemplary function of the virtual host terminal 106 to write a character string to a virtual terminal is shown in FIG. 7. The method 250 first locates a data zone in the virtual attributes buffer 140 (step 252). Data tags for each unprotected position in the virtual attributes buffer 140 are then reset (step 254). Data from each unprotected data zone position in the virtual display buffer 138 are then cleared consistent with the virtual attributes buffer 140 (step 260). The method 250 then writes a character string for a set length of text into the virtual display buffer 138 and sets one or more modified data tags associated with the current position in the virtual attributes buffer (step 262). A count is then updated to indicate data placed in the virtual display buffer 138 and the virtual attributes buffer 140 (step 264). The method 250 then returns to the caller or ends.

Figure 8:
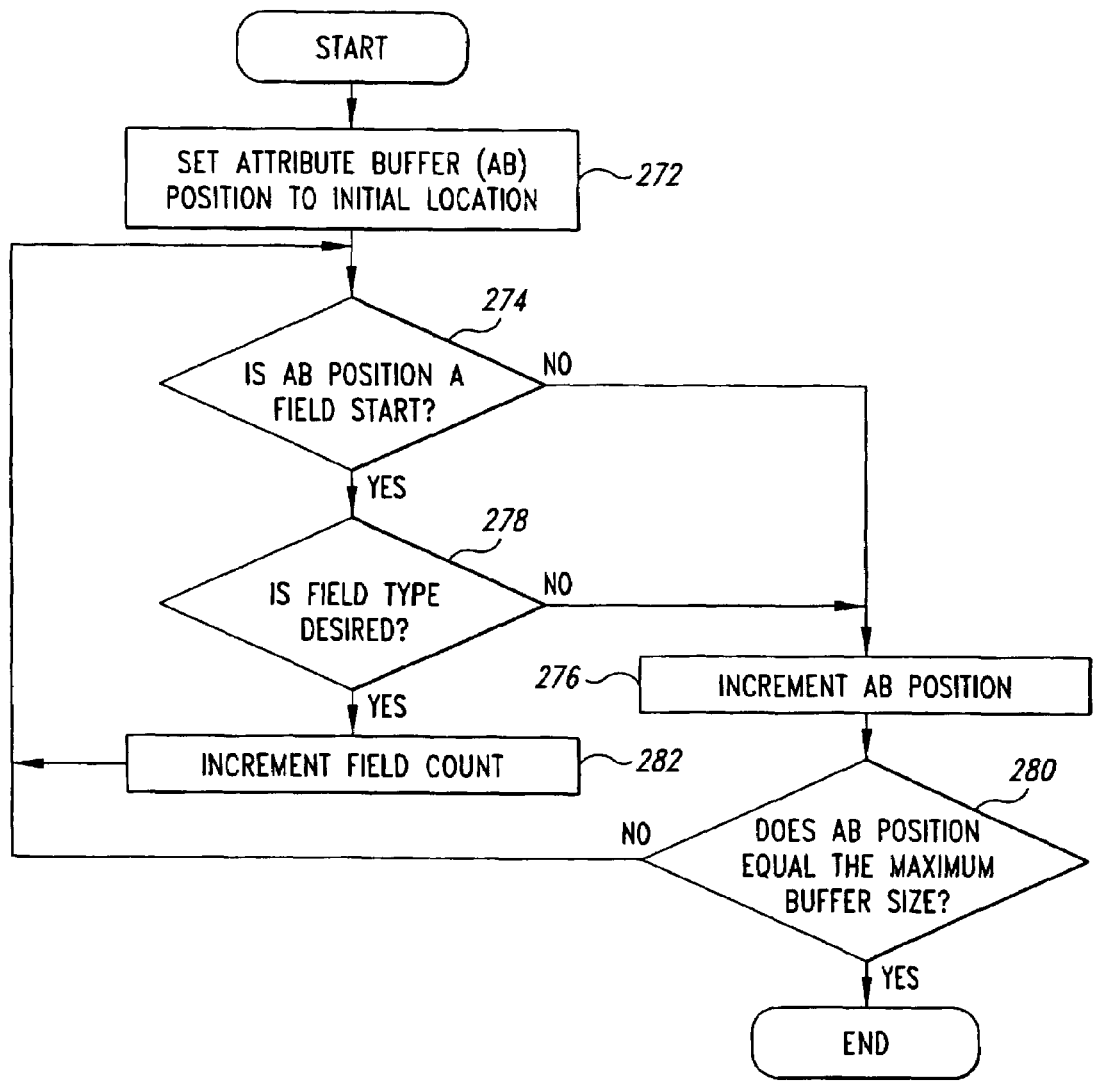
FIG. 8 is a flowchart illustrating a method implemented by the communication system, as illustrated in FIG. 2, to count the number of fields currently on a virtual terminal screen.

An illustration of a method 270 of a representative implementation of an exemplary function of the virtual host terminal 106 to count the number of fields currently on the screen of the virtual host terminal is shown in FIG. 8. The method 270 first sets the position of the virtual attributes buffer 140 to an initial location (step 272). If the position of the virtual attributes buffer 140 is not a start of a field (NO branch of decision step 274), then the position of the virtual attributes buffer is incremented (step 276). Otherwise (YES branch of decision step 274), the method 270 goes on to determine if the type of the field is not desired and if it is not desired (NO branch of decision step 278), then the position of the virtual attributes buffer 140 is incremented (step 276). Otherwise (YES branch of decision step 278), the count of the field is incremented (step 282) and the method 270 returns to decision step 274. After step 276, if the position of the virtual attributes buffer 140 does not equal the maximum buffer size (NO branch of decision step 280), the method 270 goes back to decision step 274. Otherwise (YES branch of decision step 280), the method returns to the caller or ends.

Figure 9:
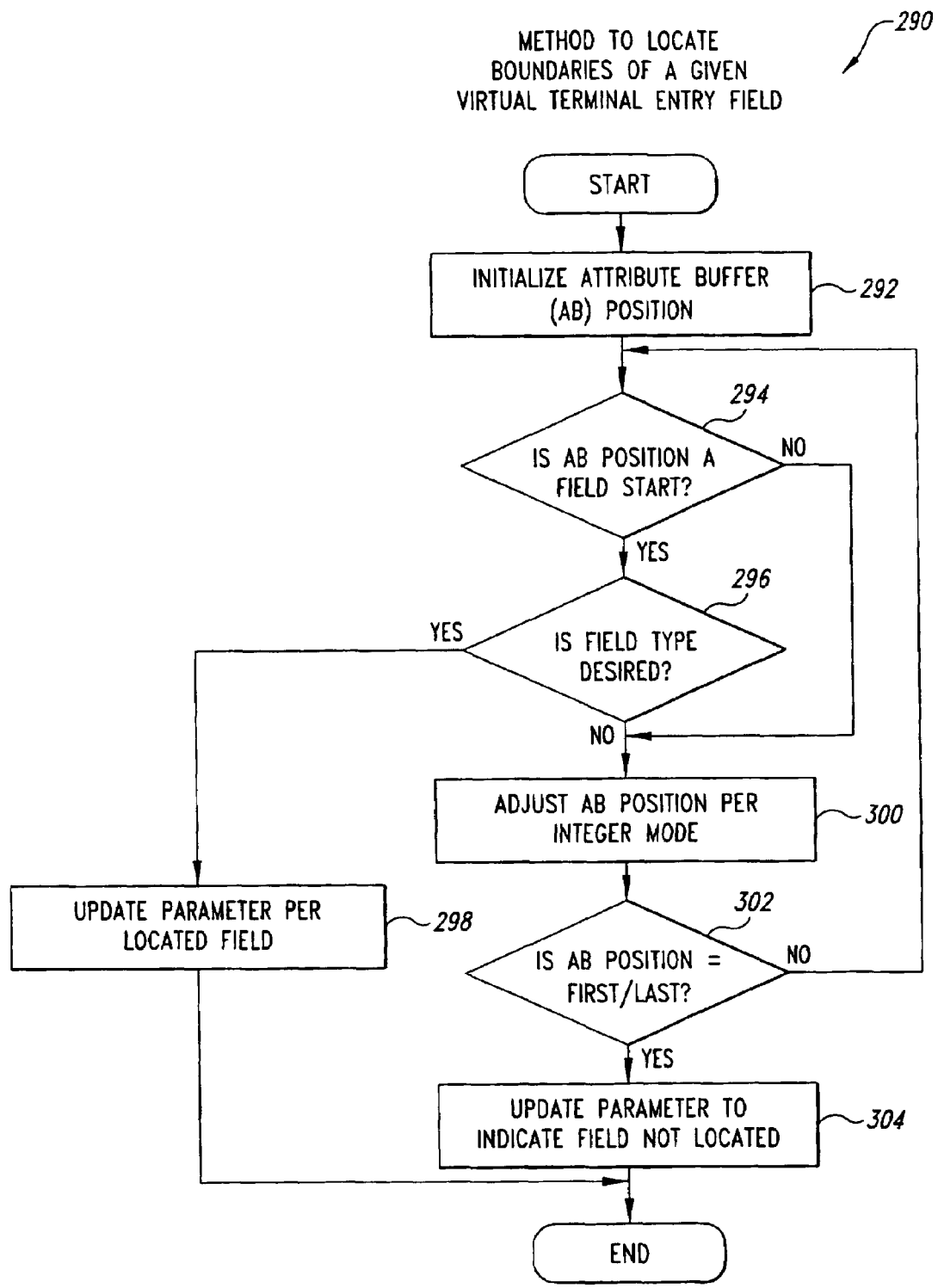
FIG. 9 is a flowchart illustrating a method implemented by the communication system, as illustrated in FIG. 2, to locate boundaries of a given virtual terminal entry field.

An illustration of a method 290 of a representative implementation of an exemplary function of the virtual host terminal 106 to locate boundaries of a given virtual terminal entry field is shown in FIG. 9. The method 290 first initializes a position of the virtual attributes buffer 140 (step 292) as the current position. If the current position of the virtual attributes buffer 140 is a start of a field (YES branch of decision step 294), the method 290 determines if the type of the field is desired (decision step 296). Otherwise (NO branch of decision step 294), the method 290 adjusts the current position of the virtual attributes buffer 140 with respect to an integer mode (step 300). If the type of the field is desired (YES branch of decision step 296), parameters are updated with respect to the located field (step 298) and the method 290 returns to the caller or ends. Otherwise (NO branch of decision step 296), step 300 is executed and if the current position of the virtual attributes buffer 140 is not equal to an end (NO branch of decision step 302), decision step 294 is repeated. Otherwise (YES branch of decision step 302), parameters are updated to indicate that the desired field was not located (step 304) and the method 290 returns to the caller or ends.

Figure 10:
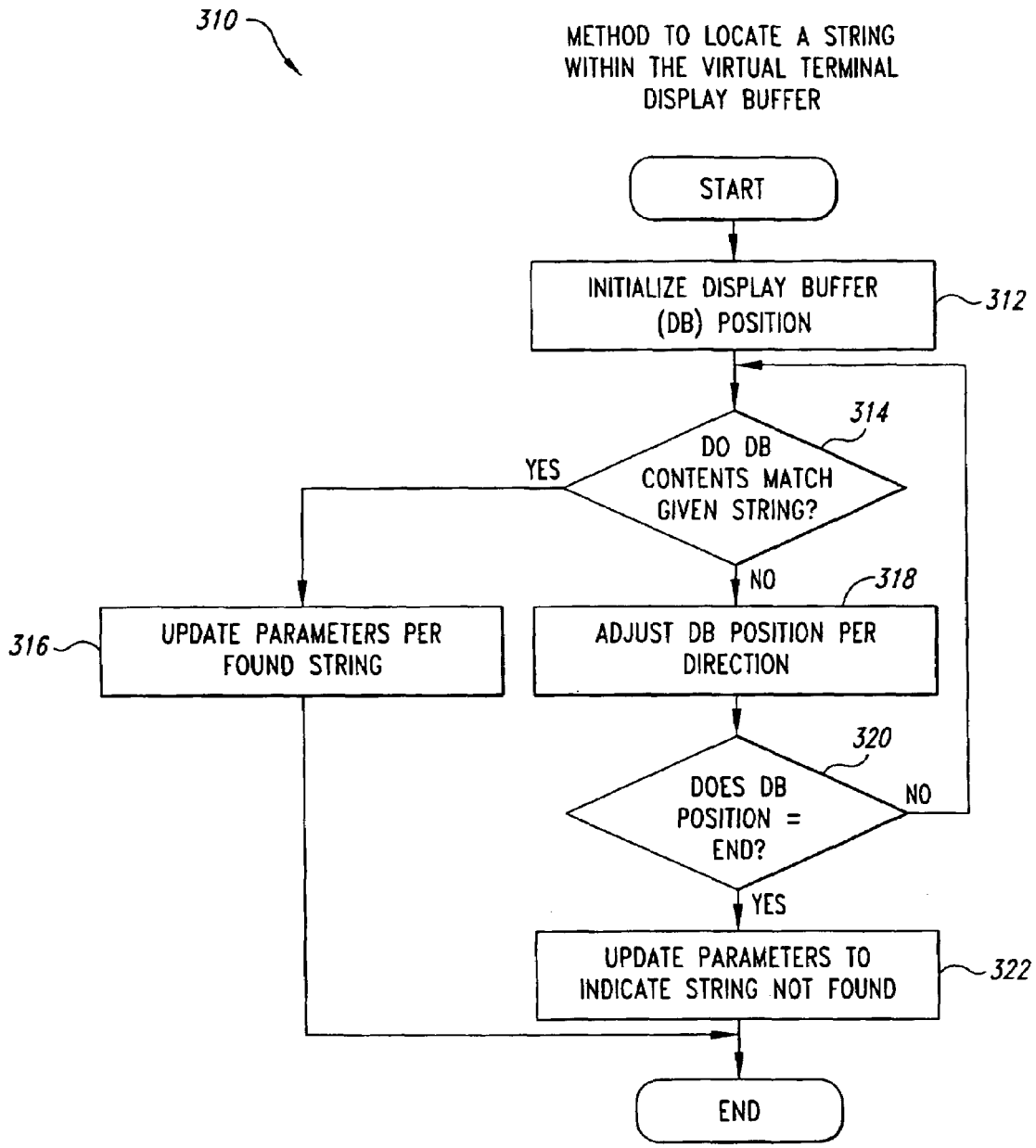
FIG. 10 is a flowchart illustrating a method implemented by the communication system, as illustrated in FIG. 2, to locate a string within the virtual terminal display buffer.

An illustration of a method 310 of a representative implementation of an exemplary function of the virtual host terminal 106 to locate a string within the virtual display buffer 138 is shown in FIG. 10. The method 310 first initializes the current position of the virtual display buffer 138 (step 312). If the contents of the virtual display buffer 138 of the current position matches the given string (YES branch of decision step 314), then parameters are updated with respect to the found string (step 316) and the method 310 ends. Otherwise (NO branch of decision step 314), the current position of the virtual display buffer 138 is adjusted according to a determined direction (step 318). Following step 318, if the current position of the virtual display buffer 138 is not an end (NO branch of decision step 320), then decision step 314 is repeated. Otherwise (YES branch of decision step 320), parameters are updated to indicate that the string was not found (step 322) and the method 310 returns to the caller or ends.

Figure 11:
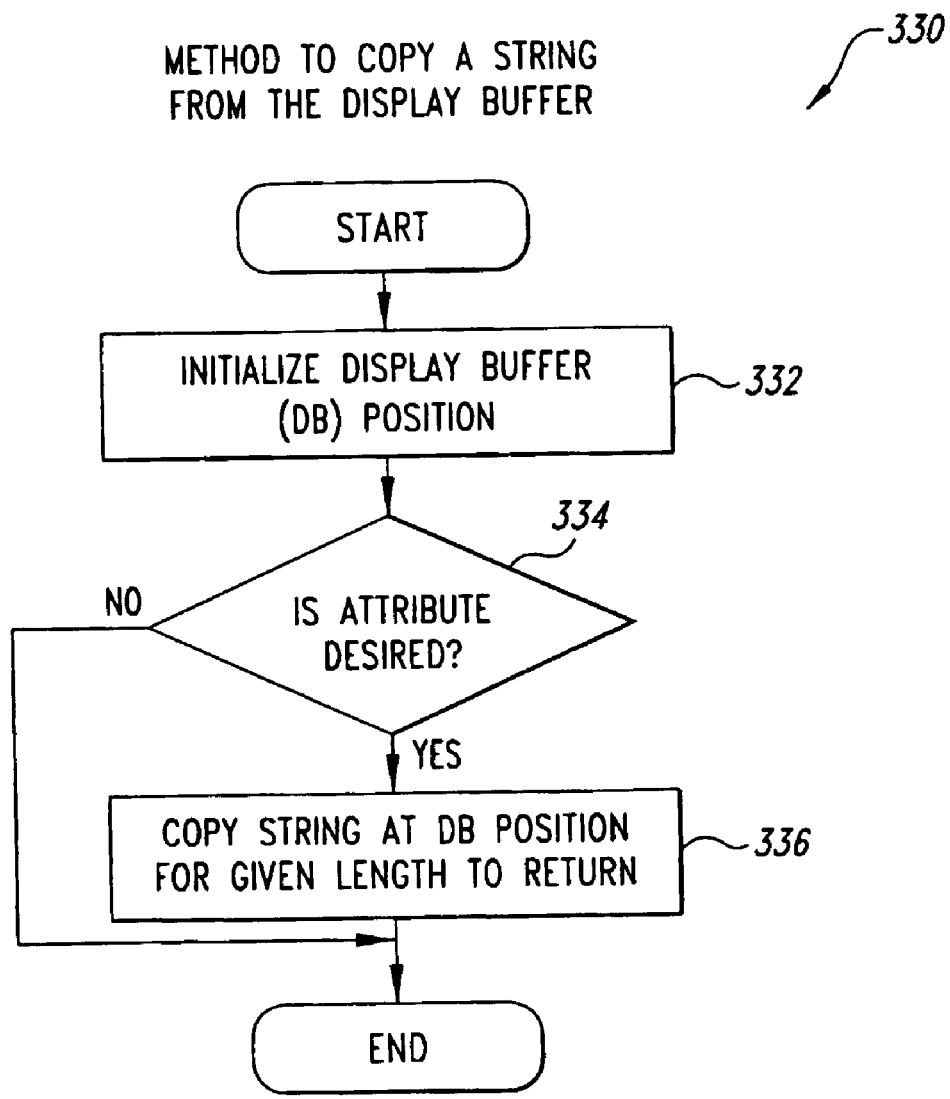
FIG. 11 is a flowchart illustrating a method implemented by the communication system, as illustrated in FIG. 2, to copy a string from the display buffer.

An illustration of a method 330 of a representative implementation of an exemplary function of the virtual host terminal 106 to copy a string from the virtual display buffer 138 is shown in FIG. 11. The method 330 first initializes the current position in the virtual display buffer 138 according to a desired location (step 332). If the attribute associated with the current position in the virtual attribute buffer 140 is desired (YES branch of decision step 334), the string at the current position of the virtual display buffer 138 is copied for a given length to return (step 336) and the method 330 returns to the caller or ends. Otherwise (NO branch of decision step 334), the method 330 returns to the caller or ends.

Figure 12:
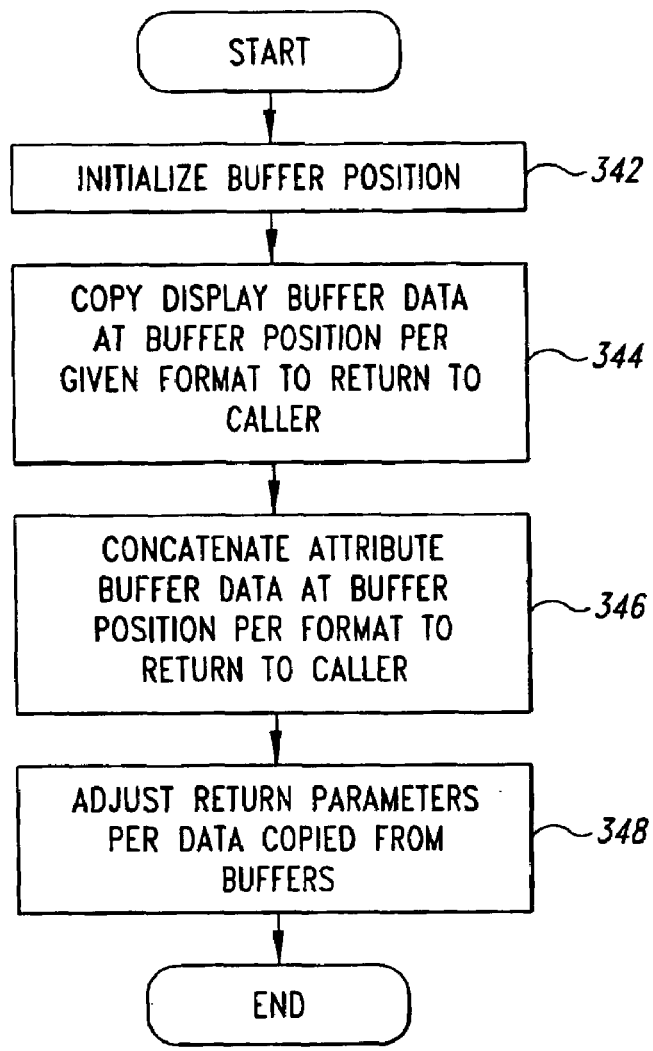
FIG. 12 is a flowchart illustrating a method implemented by the communication system, as illustrated in FIG. 2, to retrieve data and attributes from the virtual terminal buffers.

An illustration of a method 340 of a representative implementation of an exemplary function of the virtual host terminal 106 to retrieve data and attributes from the virtual display buffer 138 and the virtual attributes buffer 140 is shown in FIG. 12. The method 340 first initializes the current positions of the virtual display buffer 138 and the virtual attributes buffer 140 (step 342). Data in the virtual display buffer 138 is copied at the current position with respect to a given format for return (step 344). Data in the current position of the virtual attributes buffer 140 is then concatentated with respect to a given format for return (step 346). Return parameters are then adjusted according to the data copied from the virtual display buffer 138 in the virtual attributes buffer 140 and the method 340 returns to the caller or ends.

Figure 13A:
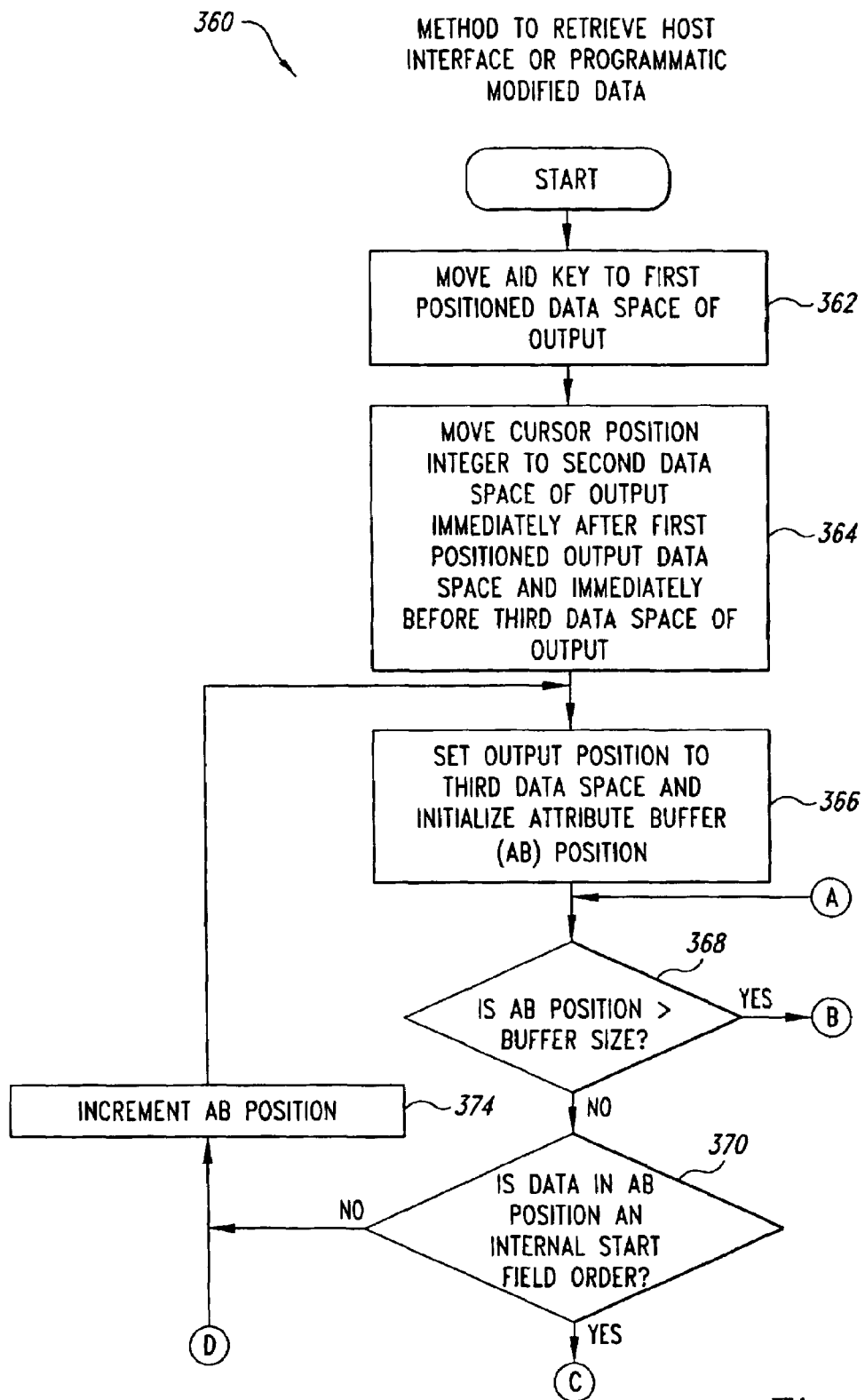
FIGS. 13A and 13B combine to describe a flowchart illustrating a method implemented by the communication system, as illustrated in FIG. 2, to retrieve the host interface or programmatic modified data.
Figure 13B:
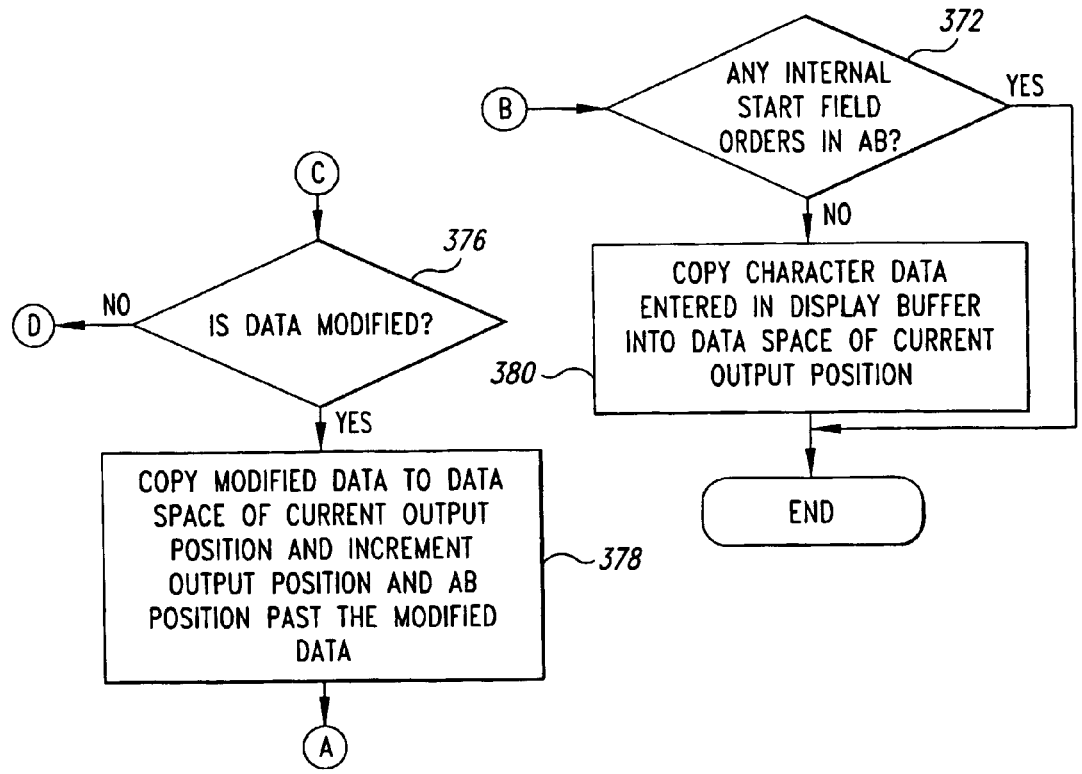

An illustration of a method 360 of a representative implementation of an exemplary function of the virtual host terminal 106 to retrieve data that has been modified by programmatic interfaces or by one of the internal applications 109 is shown in FIGS. 13A and 13B. The method 360 first moves an AID key to a first position data space of output, such as one or more bytes (step 362). The cursor position integer is then moved to a second data space of output, such as one or more bytes, immediately after the first positioned output data space and immediately before a third data space of output, such as one or more bytes (step 364). An output position is set to the third data space and a position in the virtual attributes buffer 140 is initialized as the current position (step 366). If the current position in the virtual attributes buffer 140 is not greater than the buffer size (NO branch of decision step 368), the method 360 goes to decision step 370. Otherwise (YES branch of decision step 368), the method 360 goes to decision step 372. In decision step 370, if data in the current position of the virtual attributes buffer 140 is not an internal start field order (NO branch of decision step 370), the current position of the virtual attributes buffer 140 is incremented (step 374) and then step 366 is repeated. Otherwise (YES branch of decision step 370), the method 360 goes to decision step 376. In decision step 376, if the data in the current position of the virtual attributes buffer 140 has not been modified (NO branch of decision step 376), the method 360 goes to step 374. Otherwise (YES branch of decision step 376), modified data is copied to the data space of the current position of the virtual attributes buffer 140 and the output position and the current position of the virtual attributes buffer is incremented past the modified data (step 378) and the method 360 goes to decision step 368. In decision step 372, if no internal start field order is in the virtual attributes buffer 140 (NO branch of decision step 372), character data entered in the virtual display buffer 138 is copied into the data space of the current output position of the virtual attributes buffer 140 (step 380) and the method 360 then returns to the caller or ends. Otherwise (YES branch of decision step 372) the method 360, the method 360 returns to the caller or ends.

Figure 14:
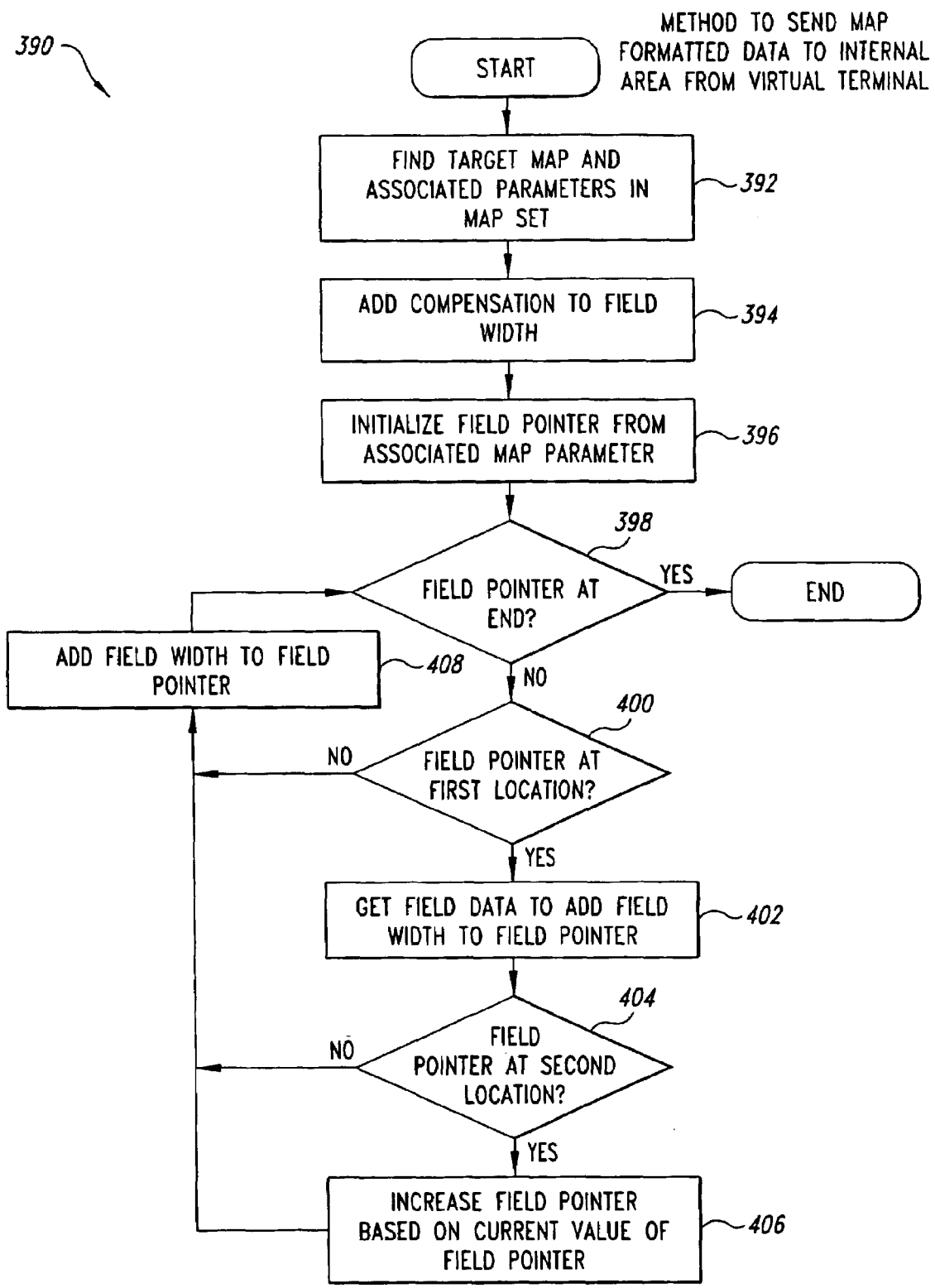
FIG. 14 is a flowchart illustrating a method implemented by the communication system, as illustrated in FIG. 2, to send map formatted data to an internal transaction area from a virtual terminal.

An illustration of a method 390 of a representative implementation of an exemplary function of the virtual host terminal 106 to send map formatted data to the internal transaction area 108 from the virtual host terminal 106 is shown in FIG. 14. The method 390 first finds a target map of interest and a related map set (step 392). Compensation is then added to an associated field width (step 394). A field pointer is then initialized from one or more of the associated map parameters (step 396). If the field pointer is at an end (YES branch of decision step 398), the method 390 returns to the caller or ends. Otherwise (NO branch of decision step 398), the method 390 goes to decision step 400. In decision step 400, if the field pointer is not at a first location (NO branch of decision step 400), a field width is added to the field pointer (step 408) and the method 390 goes back to decision step 398. Otherwise (YES branch of decision step 400), field data is obtained to add field width to the field pointer (step 402). If the field pointer is at a second location (YES branch of decision step 404), the field pointer is increased based upon a current value of the field pointer (step 406) and the method 390 goes to step 408. Otherwise (NO branch to decision step 404), the method goes to step 408.

Figure 15:
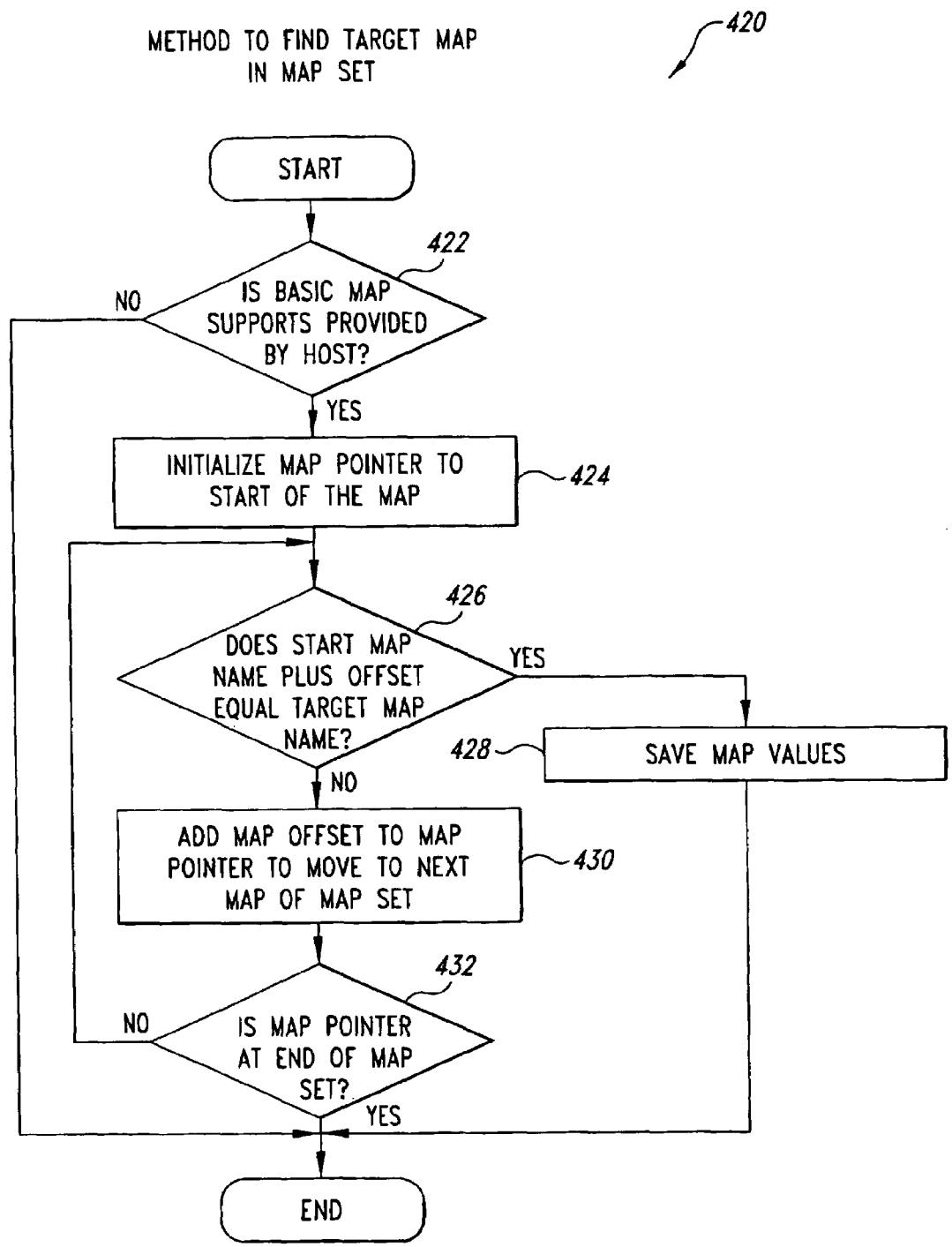
FIG. 15 is a flowchart illustrating a method implemented by the communication system, as illustrated in FIG. 2, to find a target map in a map set

An illustration of a method 420 of a representative implementation of an exemplary function of the virtual host terminal 106 to find a target map in a map set is shown in FIG. 15. The method 420 starts by determining whether basic mapping support (BMS) is provided by the internal transaction area 108 and if not (NO branch to decision step 422), returns to the caller or ends. Otherwise (YES branch of decision step 422), the method 420 initializes a map pointer to the start of the map set (step 424). A determination is made whether a start map name plus an offset is equal to a target map name and if so (YES branch of decision step 426), map values are saved (step 428) and the method 420 return to the caller or ends. Otherwise (NO branch of decision step 426), the map offset is added to the map pointer to move the map pointer to the next map of the map set (step 430). If the map pointer is not at the end of the map set (NO branch of decision step 432), the method 420 goes back to decision step 426. Otherwise (YES branch of decision step 432), the method 420 returns to the caller or ends.

Figure 16:
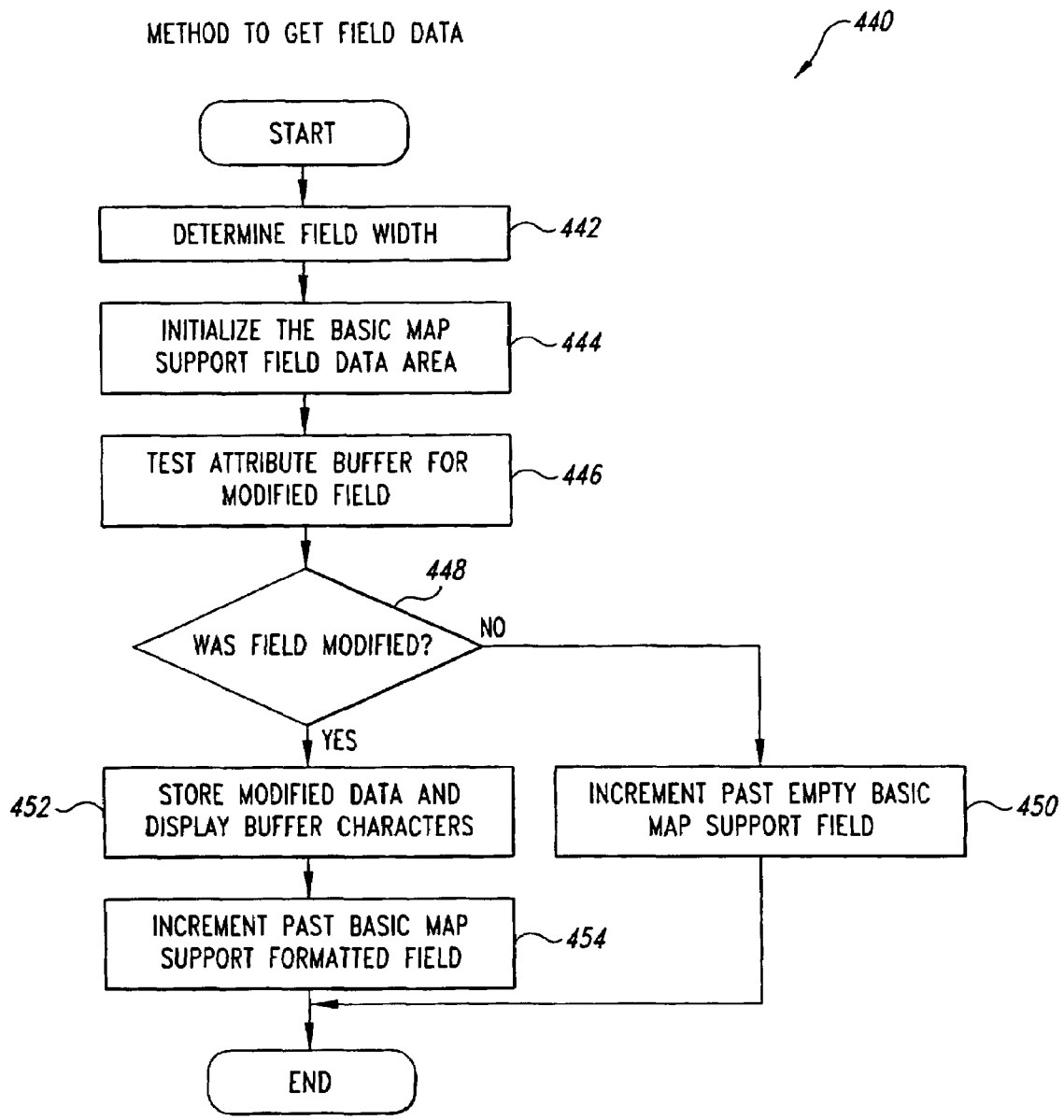
FIG. 16 is a flowchart illustrating a method implemented by the communication system, as illustrated in FIG. 2, to get field data.

An illustration of a method 440 of a representative implementation of an exemplary function of the virtual host terminal 106 to get field data is shown in FIG. 16. The method 440 starts by determining width of the desired field (step 442). The field data area of the basic mapping support (BMS) is then initialized (step 444). The virtual attributes buffer 140 is then tested for an associated modified field (step 446). If the associated field has not been modified (NO branch of decision step 448), the method 440 increments past the empty BMS field (step 450) and returns to the caller or ends. Otherwise (YES branch of decision step 448), the associated data and display buffer characters of the modified field are stored (step 452). The method 440 then increments past the BMS formatted field (step 454) and returns to the caller or ends.

Figure 17:
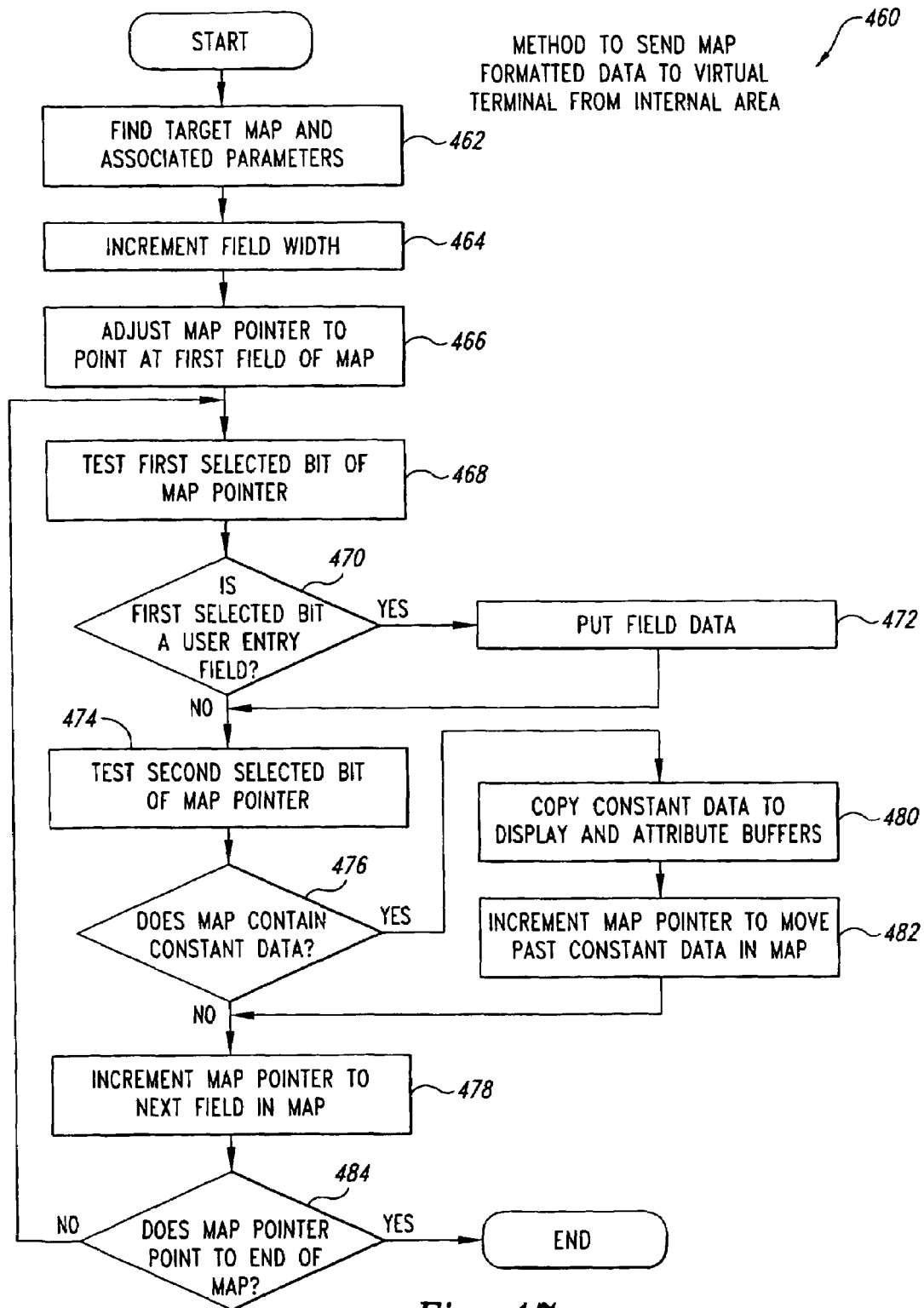
FIG. 17 is a flowchart illustrating a method implemented by the communication system, as illustrated in FIG. 2, to send map formatted data to a virtual terminal from an internal transaction area.

An illustration of a method 460 of a representative implementation of an exemplary function of the virtual host terminal 106 to send map formatted data to the virtual host terminal 106 from the internal transaction area 108 is shown in FIG. 17. The method 460 starts by finding a target map and associated parameters (step 462). A field width is then incremented (step 464). A map pointer is then adjusted to point at the first field of the target map (step 466). A first selected bit of the map pointer is tested (step 468). If the first selected bit is a user entry field (YES branch of decision step 470), the method 460 puts the field data (step 472) and goes to step 474 described below. Otherwise (NO branch of decision step 470), the method 460 tests the second selected bit of the map pointer (step 474). If the target map contains constant data (YES branch of decision step 476), the constant data is copied to the virtual display buffer 138 and the virtual attributes buffer 140 (step 480), and the map pointer is incremented to move past the constant data in the target map (step 482). The method then goes to step 478 described below. Otherwise (NO branch to decision step 476), the map pointer is incremented to the next field in the target map (step 478). If the map pointer does not point to the end of target map (NO branch of decision step 484), the method 460 goes back to step 468. Otherwise (YES branch of decision step 484), the method 460 returns to the caller or ends.

Figure 18:
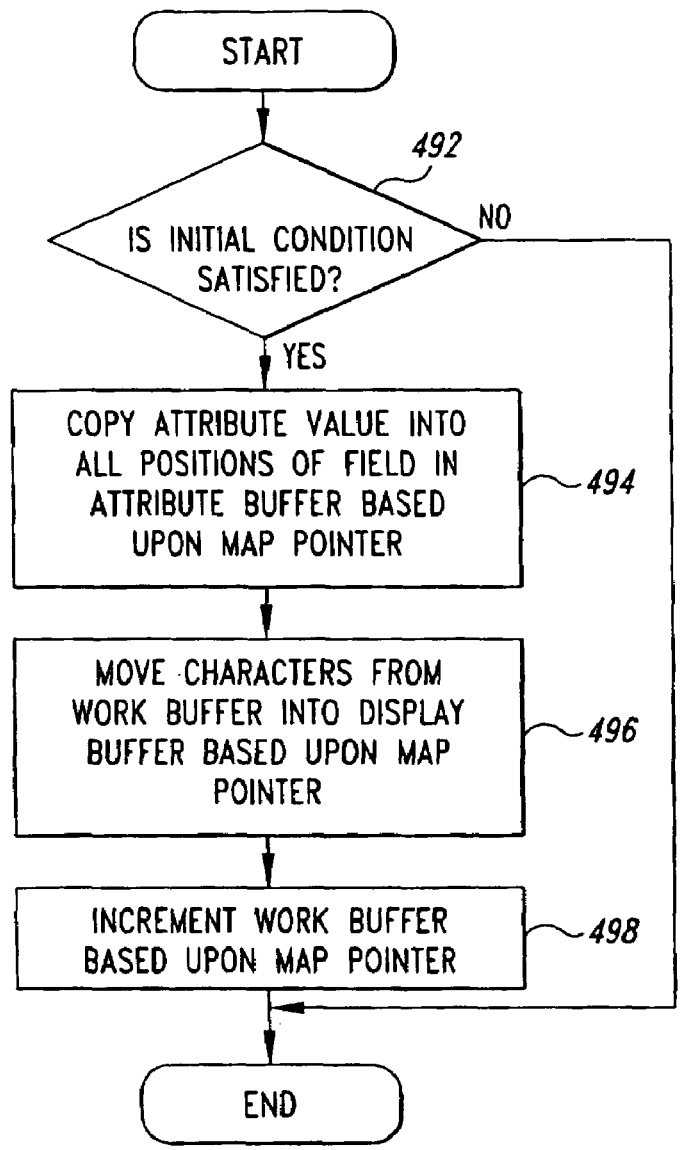
FIG. 18 is a flowchart illustrating a method implemented by the communication system, as illustrated in FIG. 2, to put field data.

An illustration of a method 490 of a representative implementation of an exemplary function of the virtual host terminal 106 to put field data is shown in FIG. 18. The method 490 starts by determining whether an initial condition is satisfied regarding a work buffer associated with the basic mapping support of the internal transaction area 108 and if not (NO branch of decision step 492), the method 490 returns to the caller or ends. Otherwise (YES branch of decision step 492), a given attribute value is copied into all positions of a field in the virtual attributes buffer 140 based upon a map pointer (step 494). Characters are then moved from the work buffer of the basic mapping support into the virtual display buffer 138 based upon the map pointer (step 496). The work buffer is then incremented based upon the map pointer (step 498) and the method 490 returns to the caller or ends.

Figure 19:
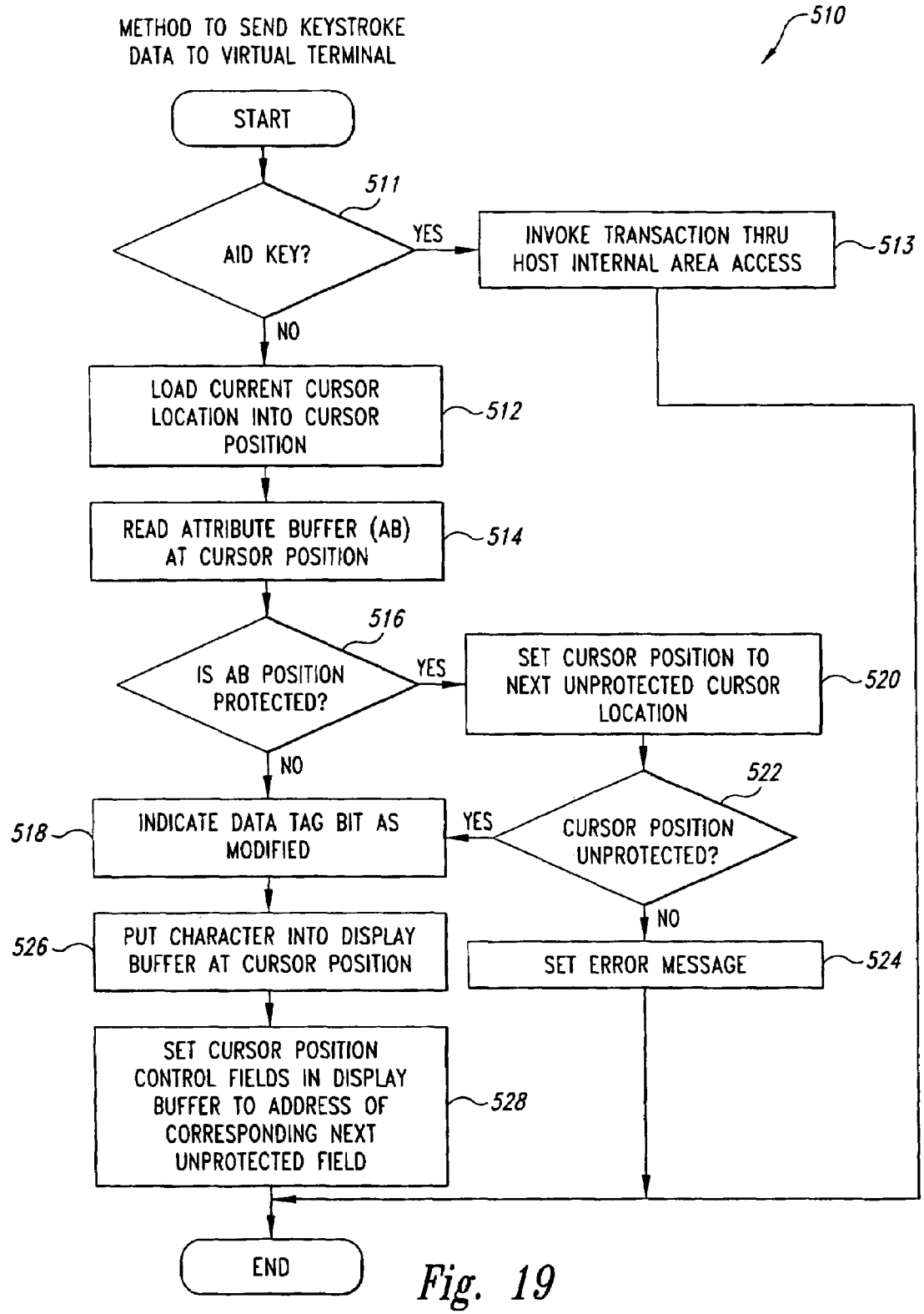
FIG. 19 is a flowchart illustrating a method implemented by the communication system, as illustrated in FIG. 2, to send keystroke data to a virtual terminal.

An illustration of a method 510 of a representative implementation of an exemplary function of the virtual host terminal 106 to send keystroke data to the virtual host terminal 106 is shown in FIG. 19. The method 510 first determines whether the keystroke data includes an AID keystroke and if so (YES branch of decision step 511), invokes a transaction through the host internal area access 110 (step 513) and then returns to the caller or ends. Otherwise (NO branch of decision step 511) the method 510, the method 510 loads the current location of the cursor into the cursor position (step 512) and then reads the virtual attributes buffer 140 at the cursor position (step 514). If the cursor position of the virtual attributes buffer 140 is protected (YES branch of decision step 516), the cursor position is set to the next unprotected cursor location (step 520) and then goes to decision step 522 described below. Otherwise (NO branch of decision step 516), a data tag bit is indicated as modified (step 518), a character is put into the virtual display buffer 138 at the cursor position (step 526), cursor position control fields in the virtual display buffer 138 are set to the address of a corresponding next unprotected field (step 526), and the method 510 returns to the caller or ends. In decision step 522, if the cursor position is unprotected (YES branch of decision step 522), the method 510 branches to step 518. Otherwise (NO branch of decision step 522), the method 510 sets an error message and returns to the caller or ends.

Figure 20A:
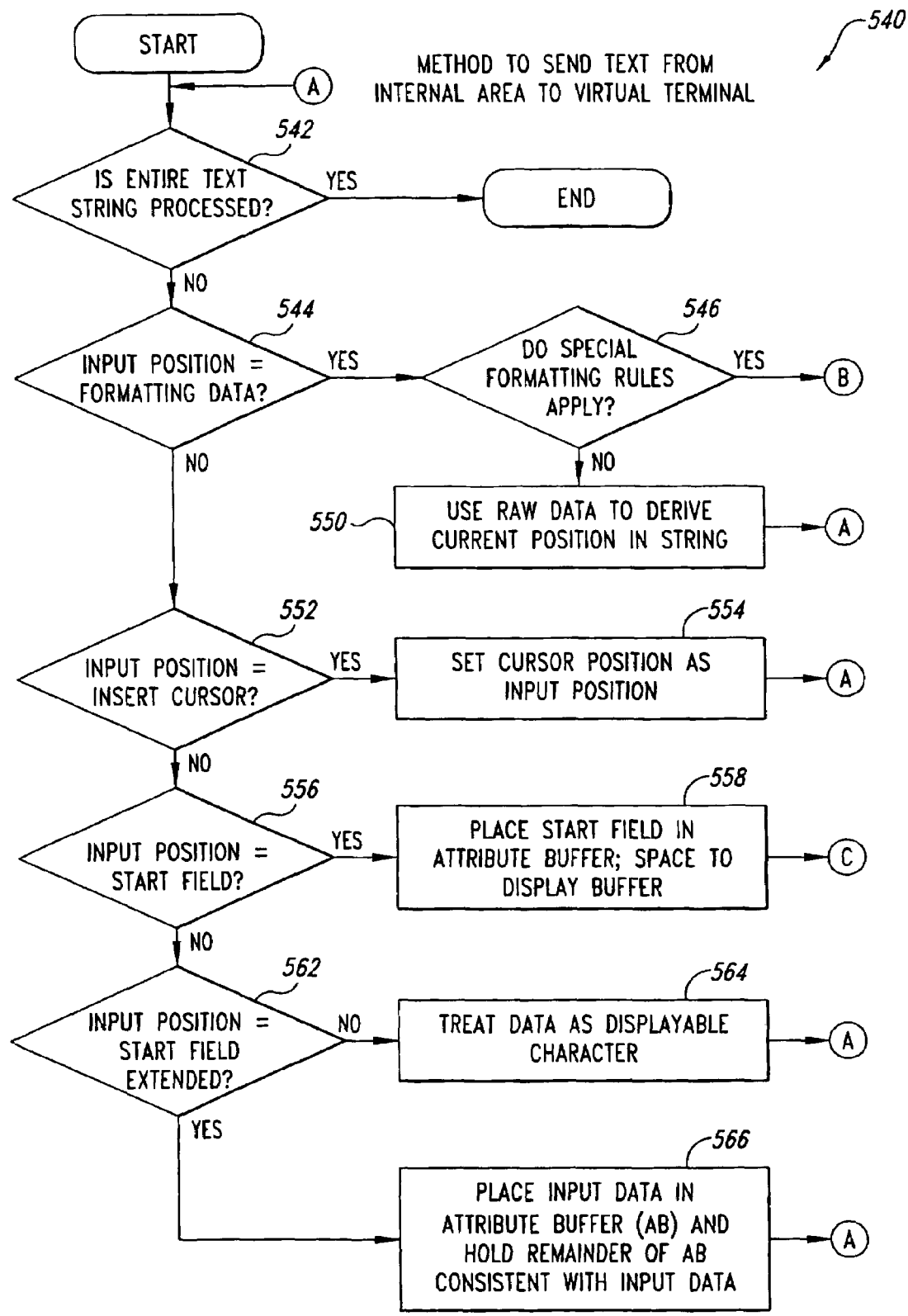
FIGS. 20A and 20B combine to describe a flowchart illustrating a method implemented by the communication system, as illustrated in FIG. 2, to send text from an internal transaction area to a virtual terminal.
Figure 20B:
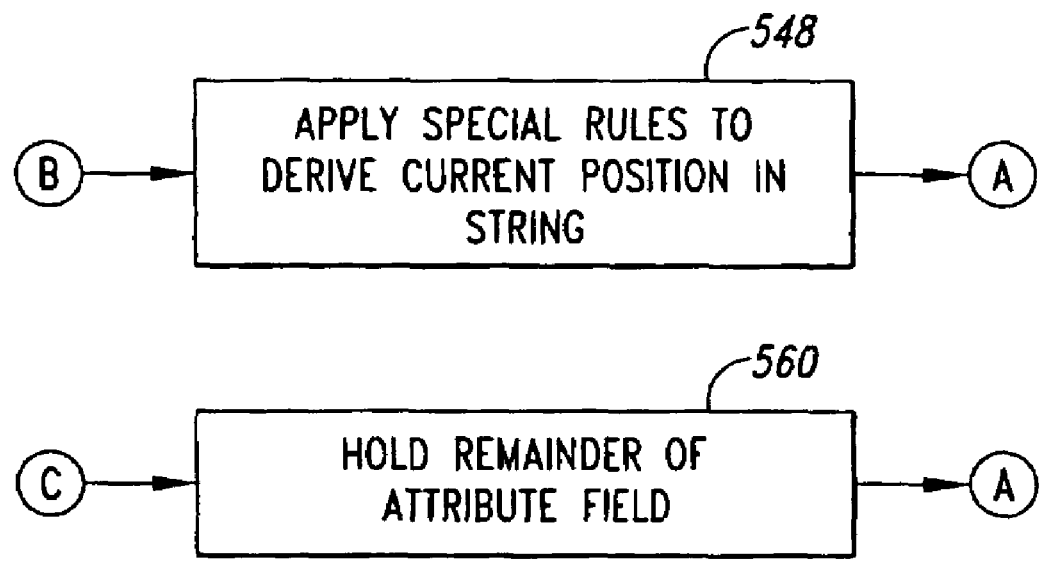

An illustration of a method 540 of a representative implementation of an exemplary function of the virtual host terminal 106 to send text from the internal transaction area 110 to the virtual host terminal 106 is shown in FIGS. 20A and 20B. The method 540 first determines if the entire text string has been processed and if so (YES branch of decision step 542), returns to the caller or ends. Otherwise (NO branch of decision step 542), the method 540 determines whether the input position is equal to data formatting and if so (YES branch of decision step 544), goes to decision step 546 described below. Otherwise (NO branch of decision step 544), the method 540 determines if the input position equals an insert cursor and if so (YES branch of decision step 552), sets the cursor position as the input position (step 554), and goes back to decision step 542. Otherwise (NO branch of decision step 552), the method 540 determines if the input position equals a start field and if so (YES branch of decision step 556), places the start field in the virtual attributes buffer 140 and spaces to the virtual display buffer 138 (step 558), holds the remainder of an associated attribute field (step 560) and goes back to decision step 542. Otherwise (NO branch of decision step 556), the method 540 determines that the input position equals a start field extended and if so (YES branch of decision step 562), places the input data into the virtual attribute buffer 140 and holds the remainder of the virtual attributes buffer consistent with the input data (step 566) and goes back to decision step 542. Otherwise (NO branch of decision step 562), the method 540 treats the input data as one or more displayable characters (step 564) and goes back to decision step 542. In decision step 546, if special formatting rules apply (YES branch decisions of 546), step 548 is executed and goes back to decision step 542. Otherwise (NO branch of decision step 546), the method 540 uses raw data to derive the current position of the text string (step 550) and then goes back to decision step 542.

Figure 21:
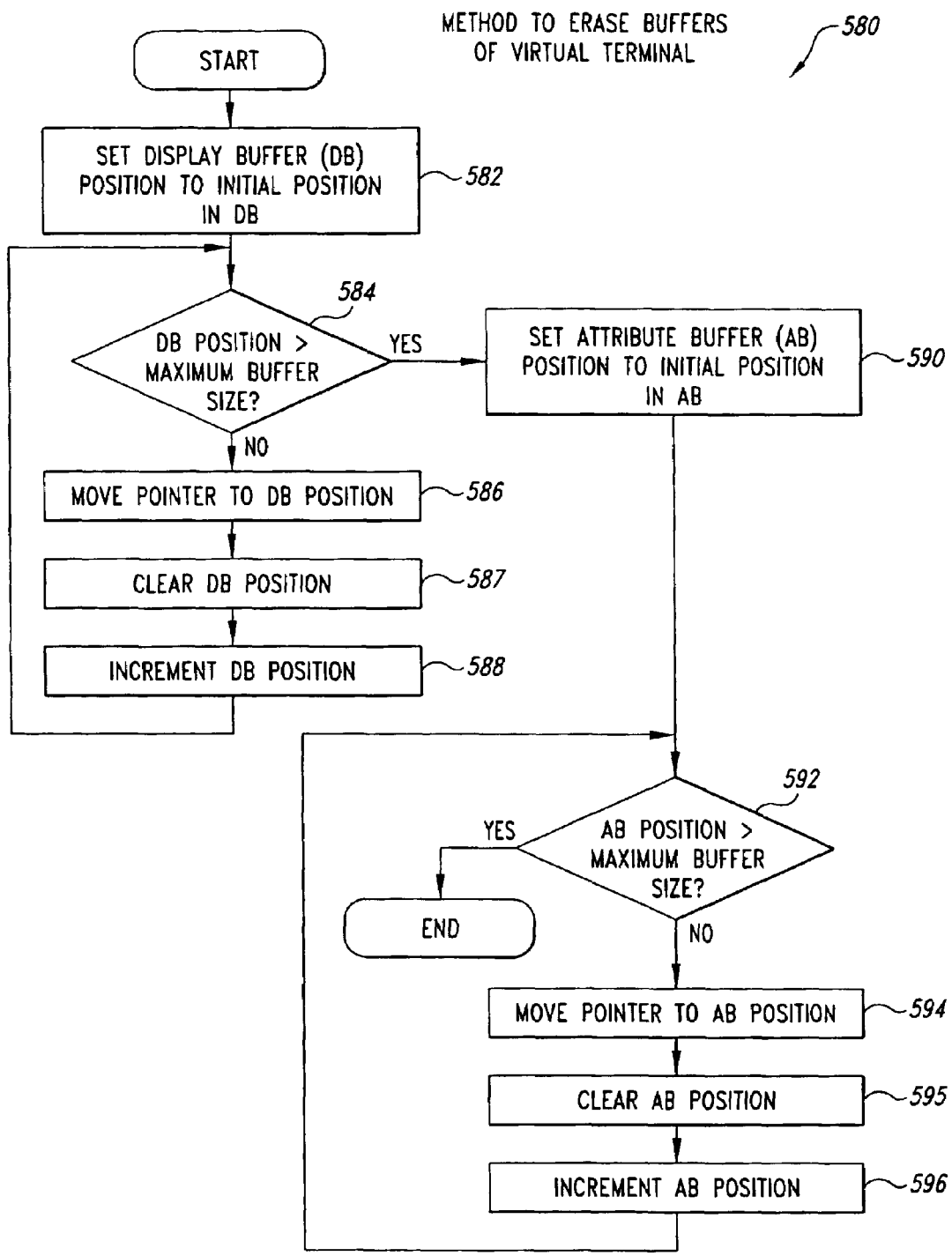
FIG. 21 is a flowchart illustrating a method implemented by the communication system, as illustrated in FIG. 2, to erase buffers of a virtual terminal.

An illustration of a method 580 of a representative implementation of an exemplary function of the virtual host terminal 106 to erase the virtual display buffer 138 and the virtual attributes buffer 140 is shown in FIG. 21. The method 580 starts by setting a virtual display buffer position in the virtual display buffer 138 to an initial position (step 582). If the virtual display buffer position is greater than a maximum buffer size (YES branch of decision step 584), the method 580 sets the virtual attributes buffer position to an initial position in the virtual attributes buffer 140 (step 590) and goes to decision step 592 described below. Otherwise (NO branch of decision step 584), the method 580 moves a pointer to the current position of the virtual display buffer 138 (step 586), clears the current position in the virtual display buffer (step 587), increments the current position of the virtual display buffer (step 588), and goes back to decision step of 584. After step 590, the method 580 determines if the current position in the virtual attributes buffer 140 is greater than a maximum buffer size and if not (NO branch of decision step 592), moves a pointer to the current position in the virtual attributes buffer (step 594), clears the virtual attributes buffer at the current position (step 595), increments the current position in the virtual attributes buffer (step 596), and goes back to decision step 592. Otherwise (YES branch of decision step 592), the method 580 returns to the caller or ends.

Figure 22A:
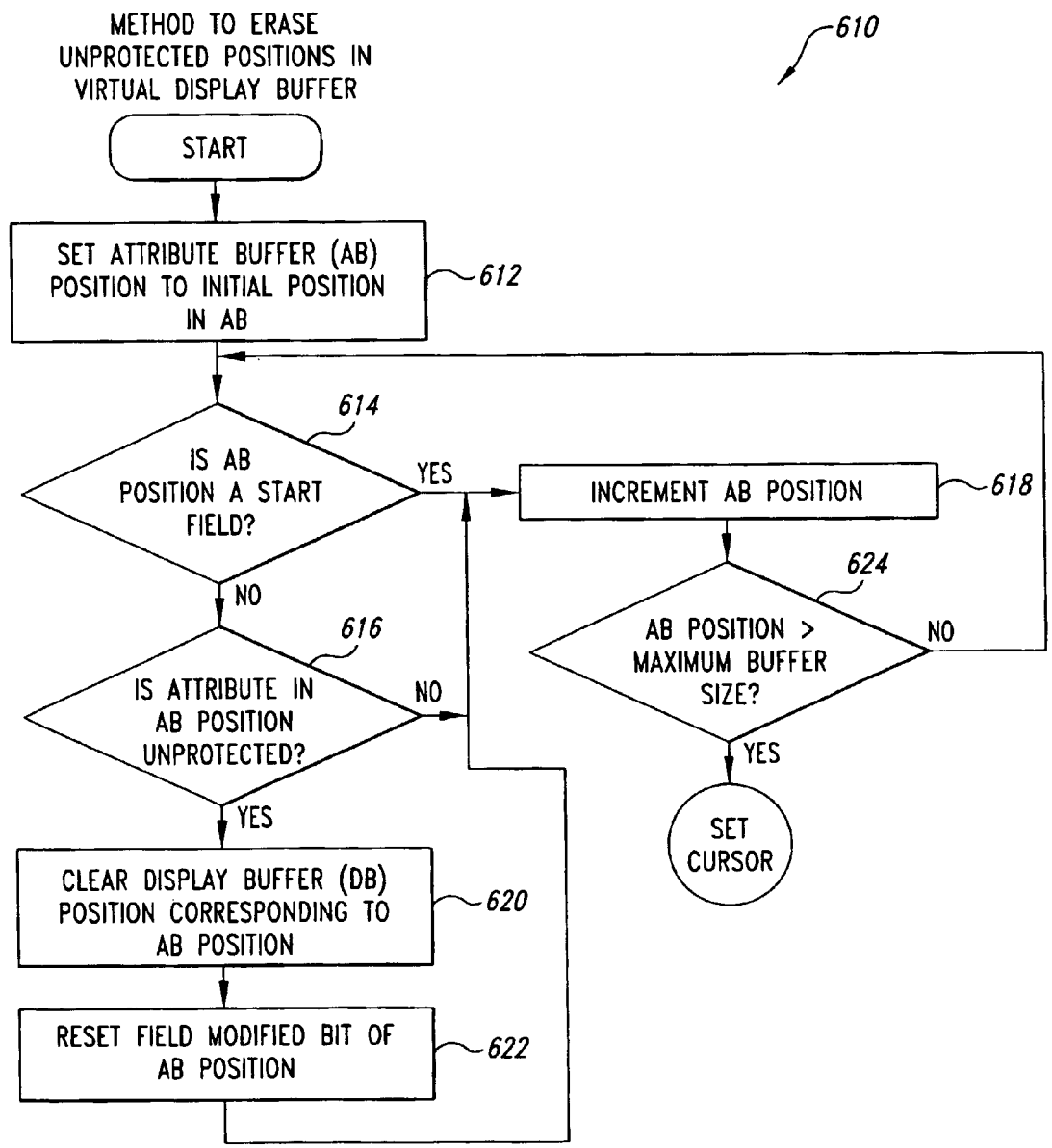
FIGS. 22A and 22B combine to describe a flowchart illustrating a method implemented by the communication system, as illustrated in FIG. 2, to erase unprotected positions in the virtual display buffer based upon corresponding attributes in the virtual attributes buffer.
Figure 22B:
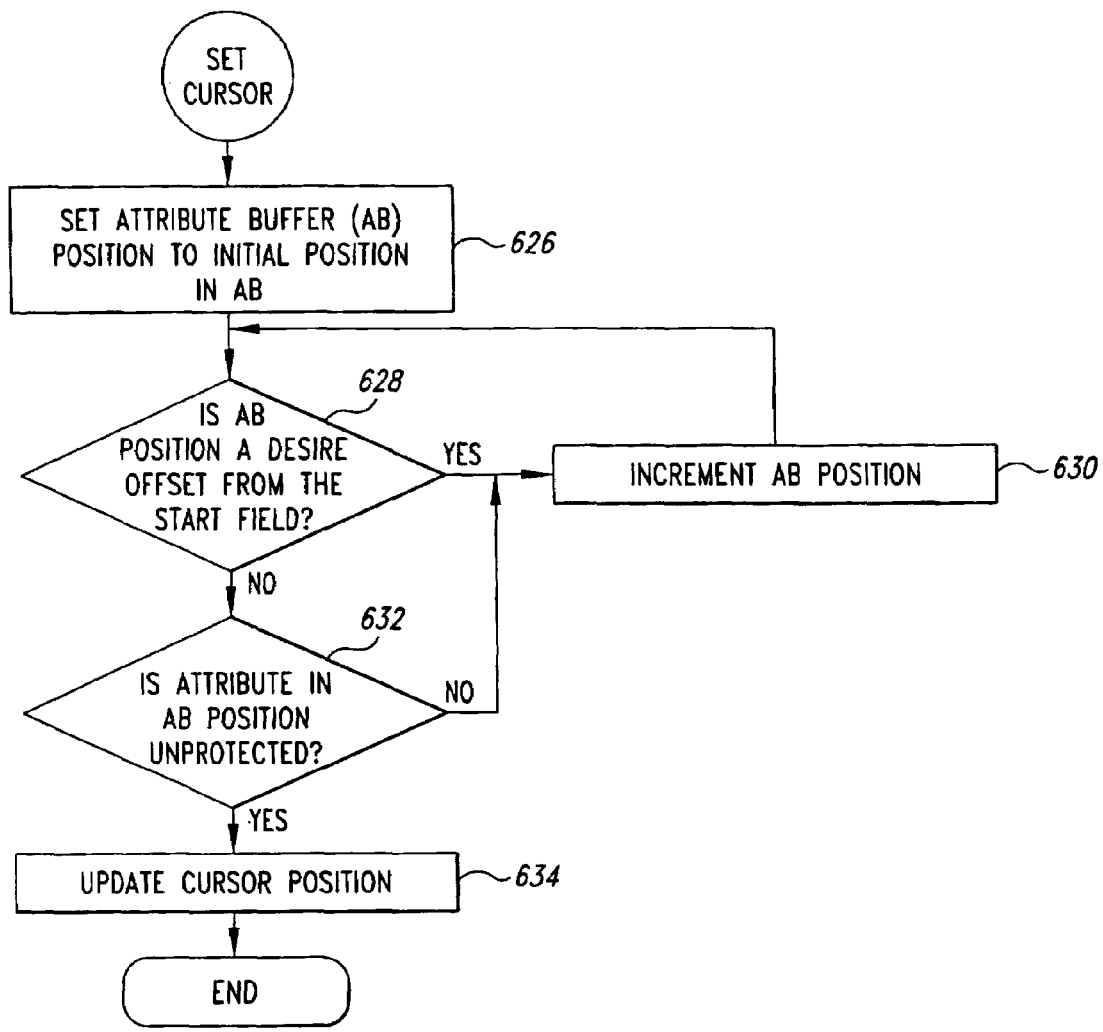

An illustration of a method 610 of a representative implementation of an exemplary function of the virtual host terminal 106 to erase unprotected positions in the virtual display buffer 138 based upon corresponding attributes in the virtual attributes buffer 140 of the virtual host terminal 106 is shown in FIGS. 22A and 22B. The method 610 starts by setting a virtual attributes buffer position of the virtual attributes buffer 140 to an initial position (step 612). If the virtual attributes buffer position is a start field (YES branch of decision step 614), the method 610 increments the virtual attributes buffer position (step 618) and goes to decision step 624 described below. Otherwise (NO branch of decision step 614), the method 610 determines whether the attribute in the virtual attributes buffer position is unprotected and if not (NO branch of decision step 616), goes to step 618. Otherwise (YES branch of decision step 616), the method 610 clears a position in the virtual display buffer 138 corresponding to the virtual attributes buffer position (step 620), resets a field modified bit corresponding with the virtual attributes buffer position (step 622), and branches back to step 618. Following step 618, the method 610 determines that the virtual attributes buffer position is greater than a maximum buffer size and if not (NO branch of decision step 624), branches back to decision step 614. Otherwise (YES branch of decision step 624), the method 610 sets the virtual attribute buffer position to an initial position in the virtual attribute buffer 140 (step 626). If the virtual attributes buffer position is a desired offset from the start field (YES branch of decision step 628), the method 610 increments the virtual attributes buffer position (step 630) and goes to decision step 628. Otherwise (NO branch of decision step 628), the method 610 determines if the attribute in the virtual attributes buffer position is unprotected and if not (NO branch of decision step 632) goes to step 630. Otherwise (YES branch of decision step 632), the cursor position is updated (step 634) and the method 610 returns to the caller or ends.

The host internal area access 110 generally does not provide prompts or sign-on screens when the internal transaction area 108 and the internal applications 109 require usernames and passwords for access by the external applications, such as when the internal transaction area involves IBM CICS with a CESN security system. It is possible for conventional approaches to use external applications that themselves prompt and save usernames and passwords to insert into every transaction into the access state controller 102, however, these approaches only partially address problems involved. If usernames and passwords are managed by the external applications to be provided with every transaction into the host internal area access 110, problems arise when a username or password is improperly entered.

Given the configuration of the typical host internal area access 110 and how the external applications systems may implement management of usernames and passwords, if an improper username or password is entered and forwarded to the host internal area access 110, the transaction would simply fail without a status message regarding the username or password ever being sent back to the external application. Users of the external application would experience failure in communication with the internal transaction area 108 and the internal applications 109 without appreciating the source of their problems. They may naturally be led to believe that the source of the communication failures were somehow located in the internal transaction area 108 without realizing that the source of the communications problems were due to their improper entry of usernames and/or passwords.

Figure 23:
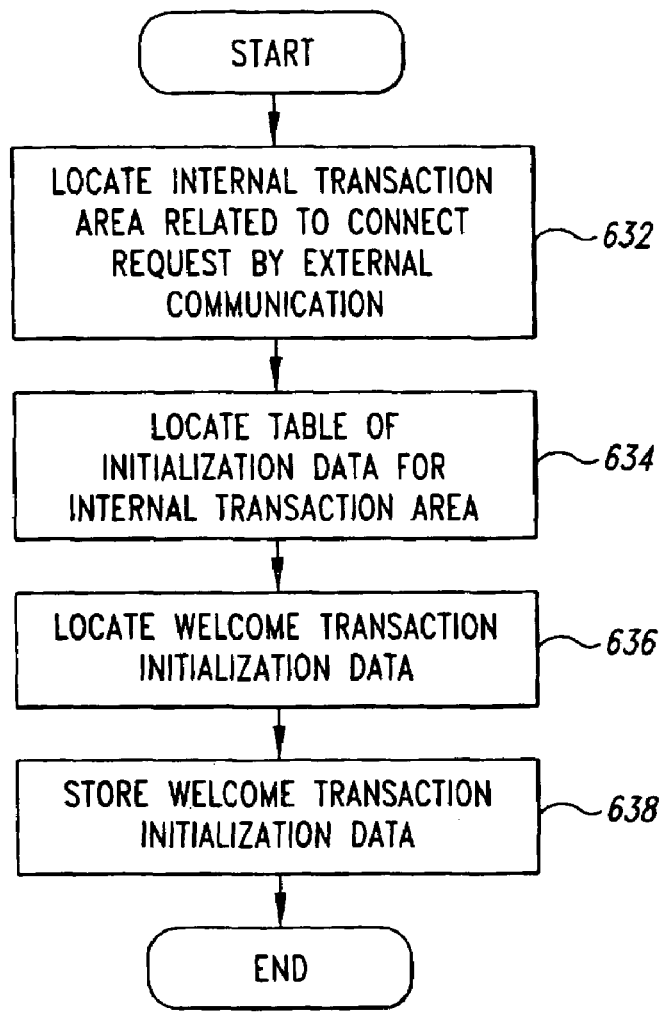
FIG. 23 is a flowchart illustrating a method to retrieve an internal transaction area identification.
Figure 24:
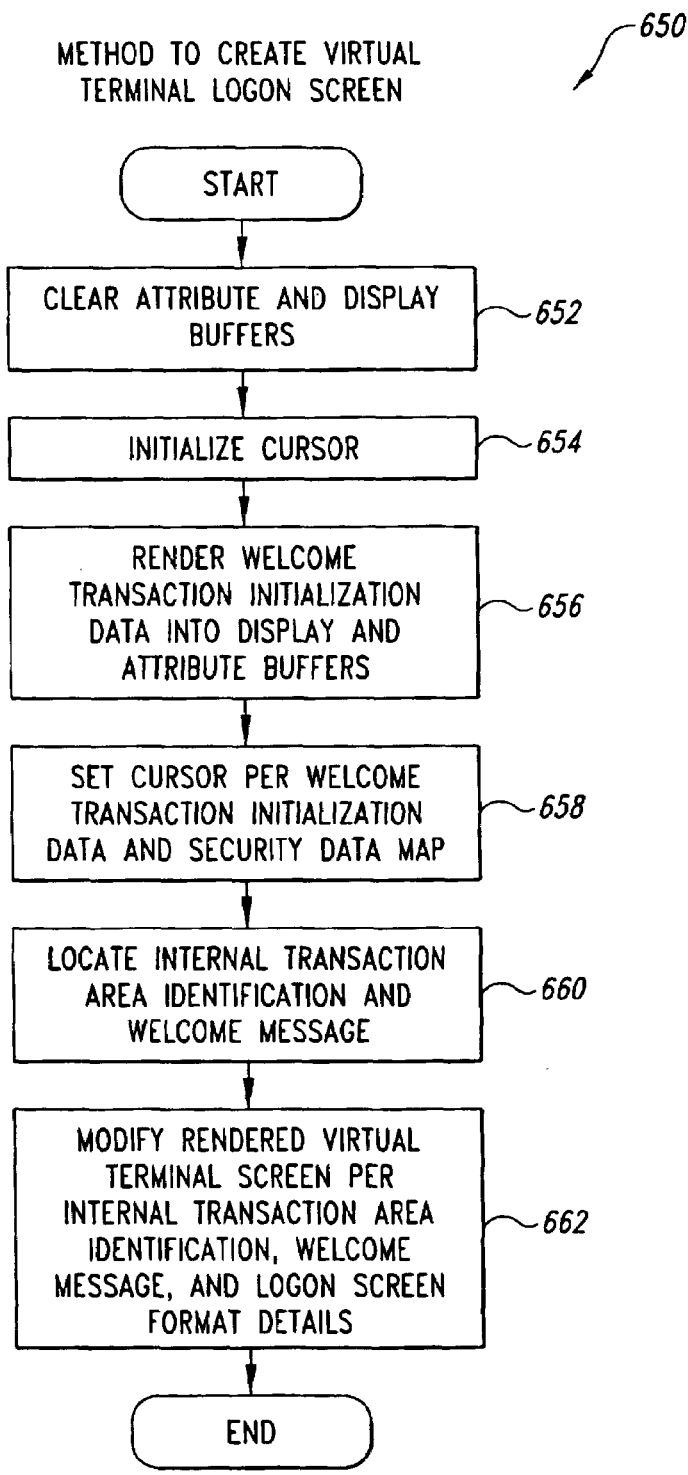
FIG. 24 is a flowchart illustrating a method to create a virtual terminal logon screen.
Figure 25:
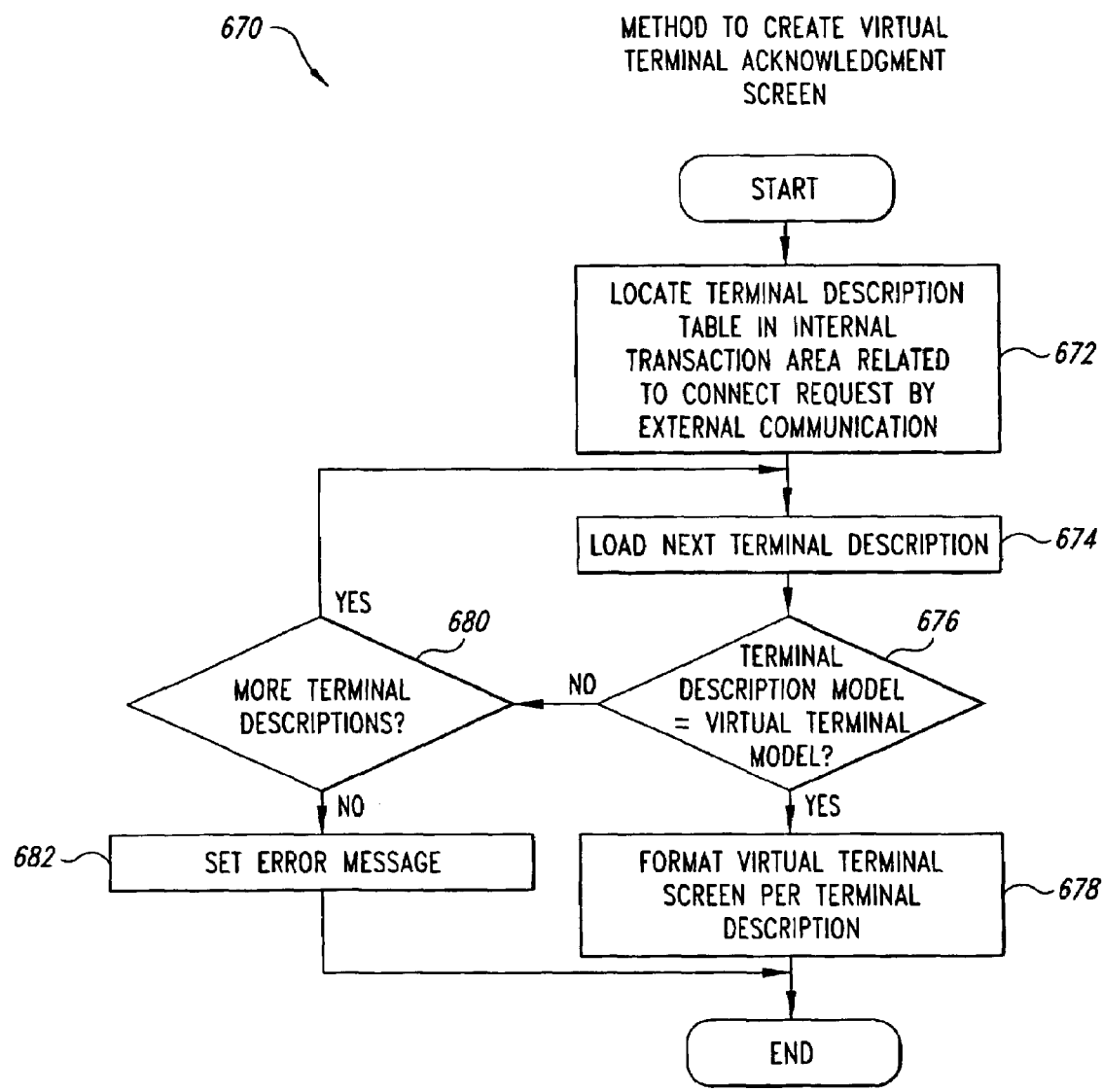
FIG. 25 is a flowchart illustrating a method to create a virtual terminal acknowledgment screen.

The internal area access communication system 100 addresses this problem by providing functions, such as those exemplary functions described in FIGS. 23-25, within the virtual terminal functions 136 of the virtual host terminal 106 that act as an intermediary for the external application regarding security procedures. If the internal transaction area 108 requires usernames and passwords, the virtual host terminal will in effect request the usernames and passwords from the external applications using screen interfaces that are part of the security system on the legacy host data system 80 supporting the internal transaction area 108. The virtual host terminal 106 receives and stores the usernames and passwords from the external applications and then subsequently uses the usernames and passwords for interaction with an external security manager 154 of the legacy host data system 80, shown in the FIG. 2, to validate users of the external applications with the security systems of the legacy host data system.

For instance, in some implementations, the virtual host terminal 106 searches through internal architecture tables of the internal transaction area 108 to extract variables that are specific to the particular internal transaction area. The virtual host terminal then applies these extracted variables to a composite image associated with a sign-on screen overlaid with constant data so that the external application sees a screen image as if it were being displayed by a terminal that was compliant with the internal transaction area 108. This facilitates the collection of usernames and passwords so that the virtual host terminal 106 can retain the usernames and passwords for interaction with the external security manager 154 without requiring security authentication to be run through the host internal area access 110.

The virtual host terminal 106 then can harvest the usernames and passwords out of its buffers to allow the access state controller 102 to issue a verification request to the external security manager 154, which could be running RACF, TOPSECRET, or other security packages. In this way the sign-on transaction is not driven through the host internal area access 110, which complies with the prohibitions imposed upon the host internal area access 110 not to facilitate security transactions. These security aspects of the virtual host terminal 106 can be applied to the terminal emulation 118 and also other external applications such as the other host applications 114 and the client applications 115 where program-to-program communication may also be run in a secured mode without need of the sign-on transactions going through the host internal area access 110.

In an exemplary implementation during a connect request, the access state controller 102 requests an initial welcome message from the internal transaction area 108. This initial welcome message could come in three possible forms: a welcome message having no associated security aspects, a welcome message identifying security aspects compliant with the internal transaction area 108, or a transaction that is particular to an installation of the internal transaction area that initially runs, such as a bulletin board. FIG. 23 illustrates the method in which identification of the internal transaction area 108 is obtained in order to determine what type of welcome message transaction is involved with the internal transaction area. In the situation where the internal transaction area 108 requires username and password, the access state controller 102 instructs the virtual host terminal 106 to provide a sign-on screen to the associated external application to request such username and password as illustrated in FIG. 24 for an exemplary implementation.

Once a successful sign-on has been completed an acknowledgment message is typically sent to the signed-on user. Since the host internal area access 110 is typically not allowed to pass such acknowledgment messages, the virtual host terminal 106 is configured to generate such an acknowledgment message complying with the format of the local installation and to send this to the external application. An exemplary implementation of generating an acknowledgment message is illustrated in FIG. 25.

An illustration of a method 630 of a representative implementation of an exemplary function of the virtual host terminal 106 to retrieve an identification of the internal transaction area 108 is shown in FIG. 23. The method 630 starts by locating the internal transaction area 108 related to a connect request associated with an external communication (step 632). A table of initialization data for the located internal transaction area 108 is then found (step 634). Initialization data for a welcome transaction is then located (step 636). The initialization data for the welcome transaction is then stored (step 638) and the method 630 returns to the caller or ends.

An illustration of a method 650 of a representative implementation of an exemplary function of the virtual host terminal 106 to create a virtual host terminal logon screen is shown in FIG. 24. The method 650 first clears the virtual display buffer 138 and the virtual attributes buffer 140 (step 652) and initializes a cursor (step 654). The method 650 then renders welcome transaction initialization data into the virtual display buffer 138 and the virtual attributes buffer 140 (step 656) and sets the cursor with respect to the welcome transaction initialization data and associated security data map (step 658). The method 650 locates a welcome message and an identification associated with the internal transaction area 108 (step 660), modifies the rendered terminal screen of the virtual host terminal 106 with respect to the identification, welcome message, and logon screen format details of the internal transaction area 108 (step 662) and then returns to the caller or ends.

An illustration of a method 670 of a representative implementation of an exemplary function of the virtual host terminal 106 to create an acknowledgment screen for the virtual host terminal 106 is shown in FIG. 25. The method 670 locates a terminal description table in the internal transaction area 108 related to a connect request by an external communication (step 672) and loads a next terminal description (step 674). Determination is made whether the terminal model associated with a terminal description equals the terminal model of the virtual host terminal 106 and if not (NO branch of decision step 676), the method 670 goes to decision step 680 described below. Otherwise (YES branch of decision steps 676) the method 670 formats the terminal screen of the virtual host terminal 106 with respect to the found terminal description (step 678) and returns to the caller or ends. In decision step 680, the method 670 determines whether or not there are more terminal descriptions in the terminal description table to check in decision step 676 and if so (YES branch of decision step 680), goes back to step 674. Otherwise (NO branch of decision step 680), the method 670 sets an error message (step 682) and returns to the caller or ends.

Figure 26:
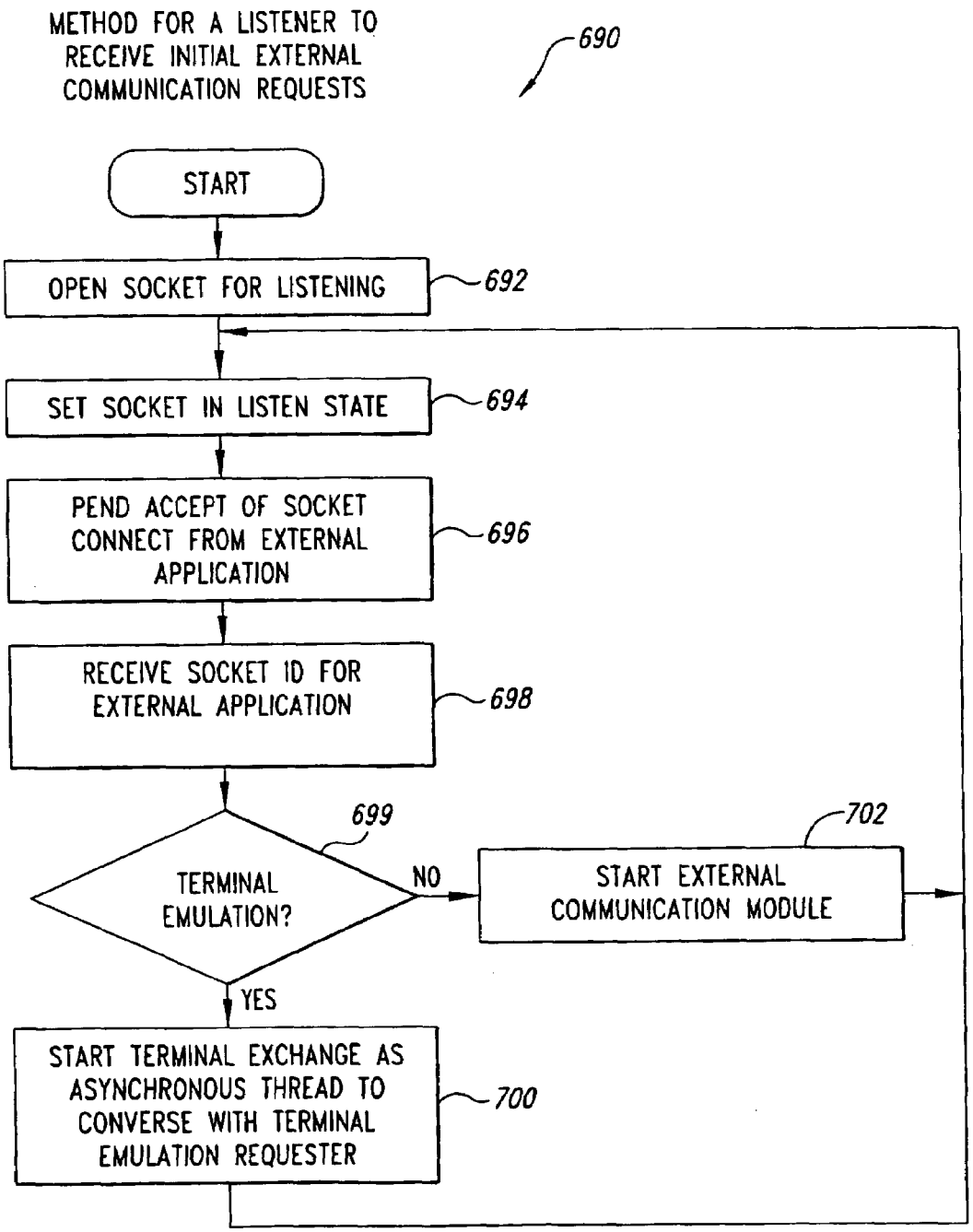
FIG. 26 is a flowchart illustrating a listener method to receive initial external communication requests.

An illustration of a method 690 of a representative implementation for the listener 152 to receive initial external communication requests is shown in FIGS. 26. The method 690 opens a socket for the listener 152 to listen for initial external communication requests (step 692) and sets the socket in a listen state (step 694). When an initial external communication requests is heard by the listener 152, the method 690 then pends an accept of a socket connect from the associated external application (step 696). Socket identification for the external application is then received (step 698). If the external application is the terminal emulation 118 (YES branch of decision step 699), the terminal exchange 142 is started as an asynchronous thread to converse with the external application as a terminal emulation requester (step 700) and the method 710 then goes back to step 694. Otherwise (NO branch of decision step 699), the external communication module is started to communicate with the external application (step 702) and the method 710 then goes back to step 694.

Figure 27:
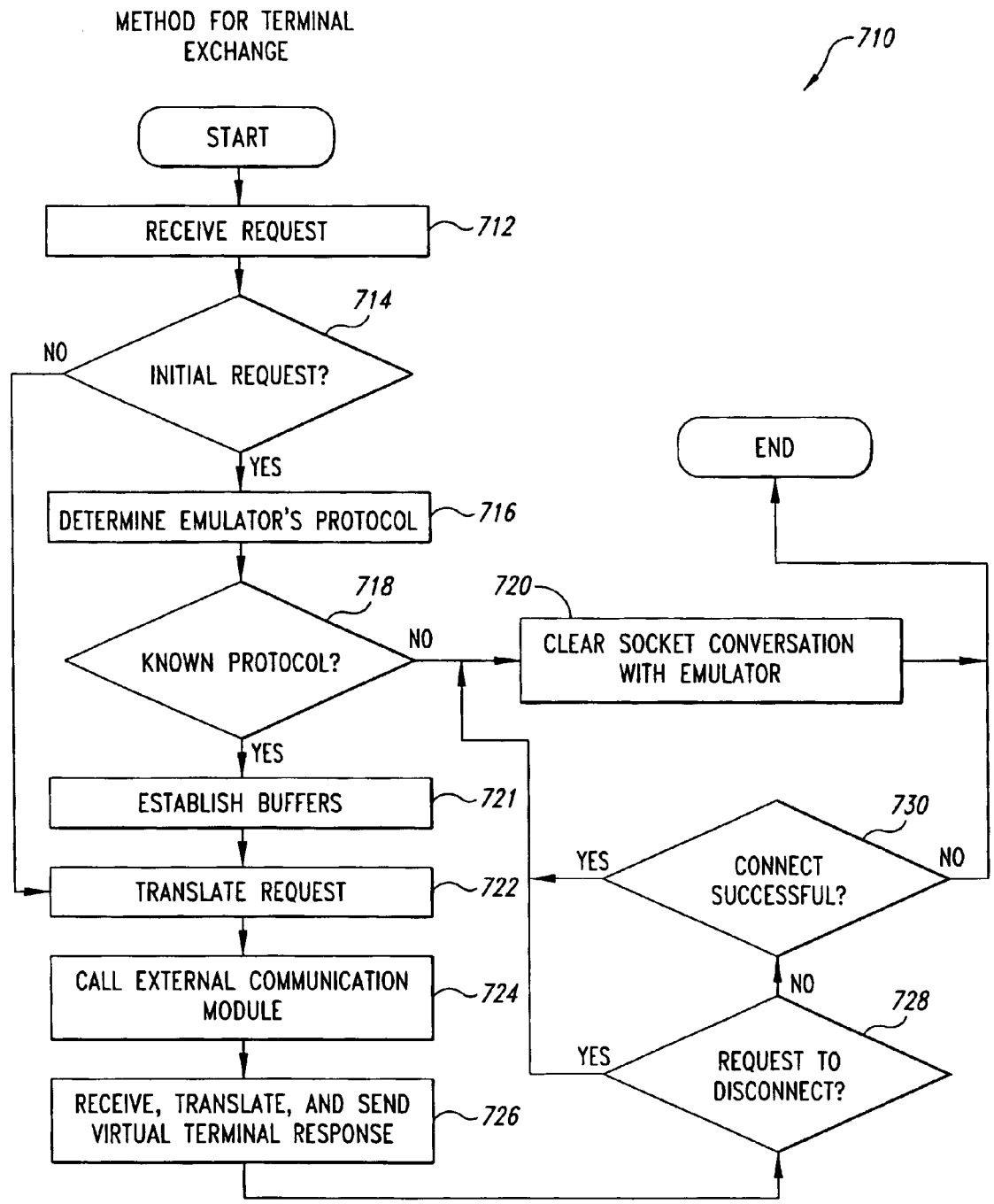
FIG. 27 is a flowchart illustrating a method for terminal exchange.

An illustration of a method 710 of a representative implementation for the terminal exchange 142 is shown in FIG. 27. According to the method 710, the terminal exchange 142 receives a communication request from one of the terminal emulations 118 (step 712), determines whether the request is an initial request and if so (YES branch of decision step 714), determines communication protocol of the terminal emulation (step 716). If the communication protocol of the terminal emulation 118 is known (YES branch of decision step 718), buffers are established (step 721) and the communication from the terminal emulation is translated (step 722). If the communication request received is not an initial request (NO branch of decision step 714), the method 710 goes directly to step 722. If the protocol of the communication request is not known (NO branch of decision step 718), the socket conversation with the terminal emulation 118 is cleared (step 720) and the method 710 returns to the caller or ends. Following step 722, the external communication module 104 is called (step 724), and any response from the virtual host terminal 106 is received, translated, and sent back to the terminal emulation 118 (step 726). If the communication request from the terminal emulation 118 is a request to disconnect (YES condition of decision step 728), step 720 is executed. Otherwise (NO condition of decision step 728), a determination is made whether the connect was successful and if so (YES branch of decision step 730), step 720 is executed. Otherwise (NO condition of decision step 730), the method 710 returns to the caller or ends.

Figure 28A:
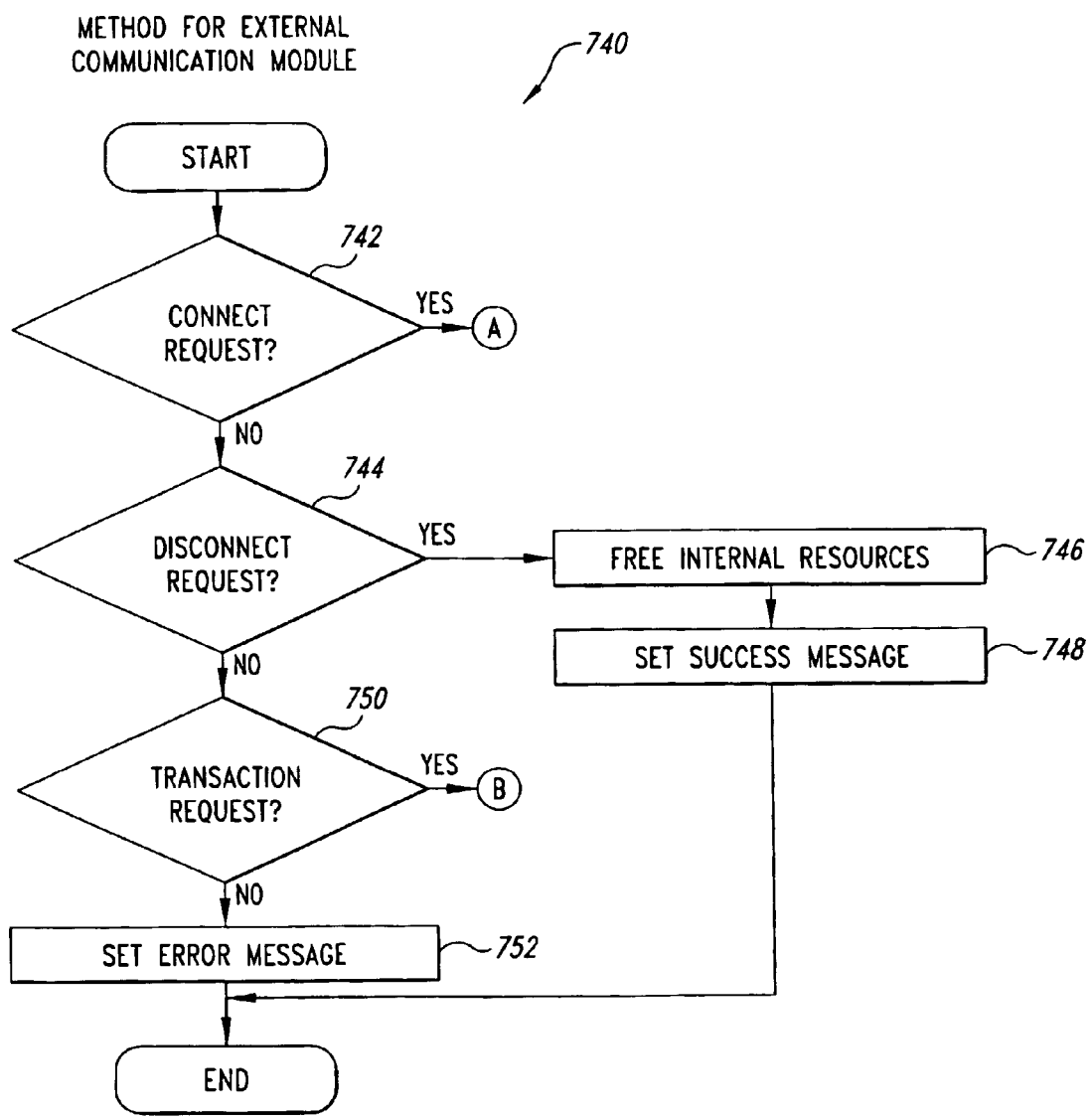
FIGS. 28A, 28B, and 28C combine to describe a flowchart illustrating a method for an external communication module.
Figure 28B:
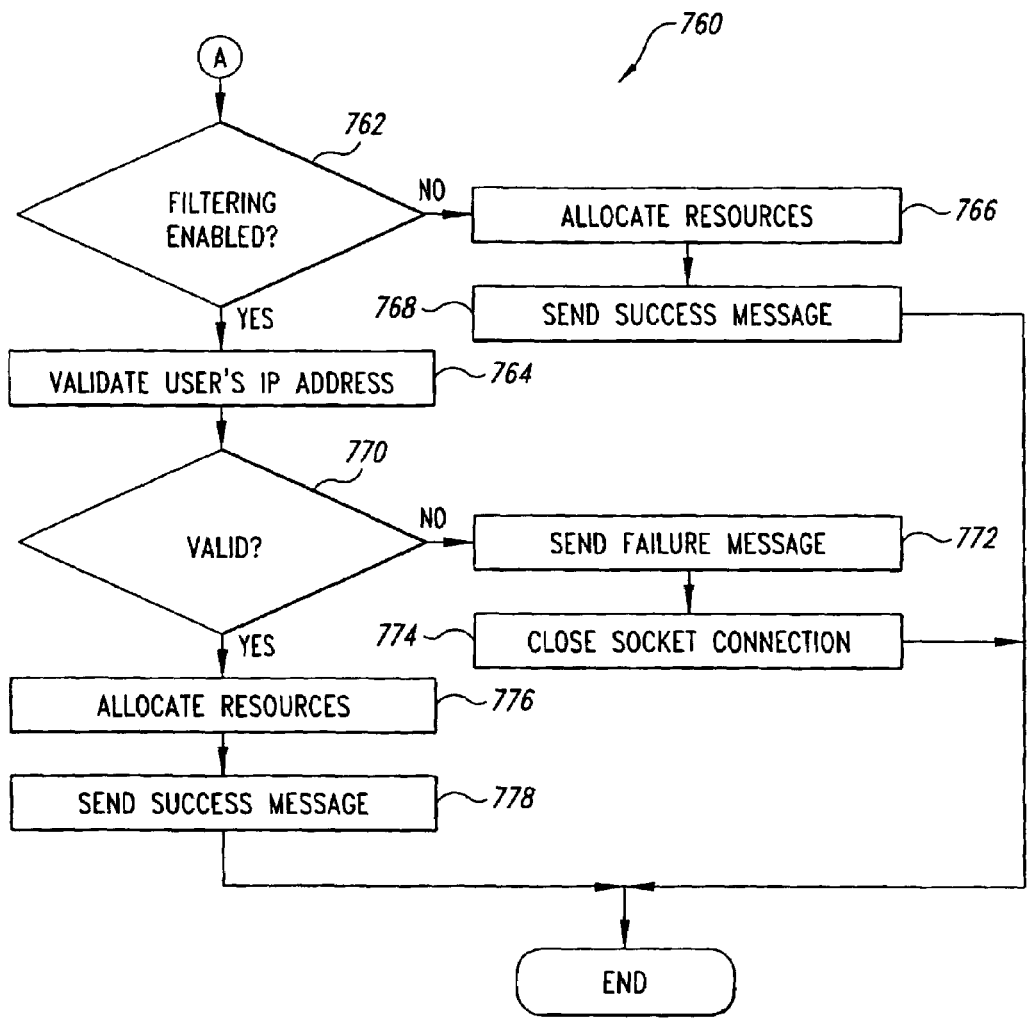
Figure 28C:
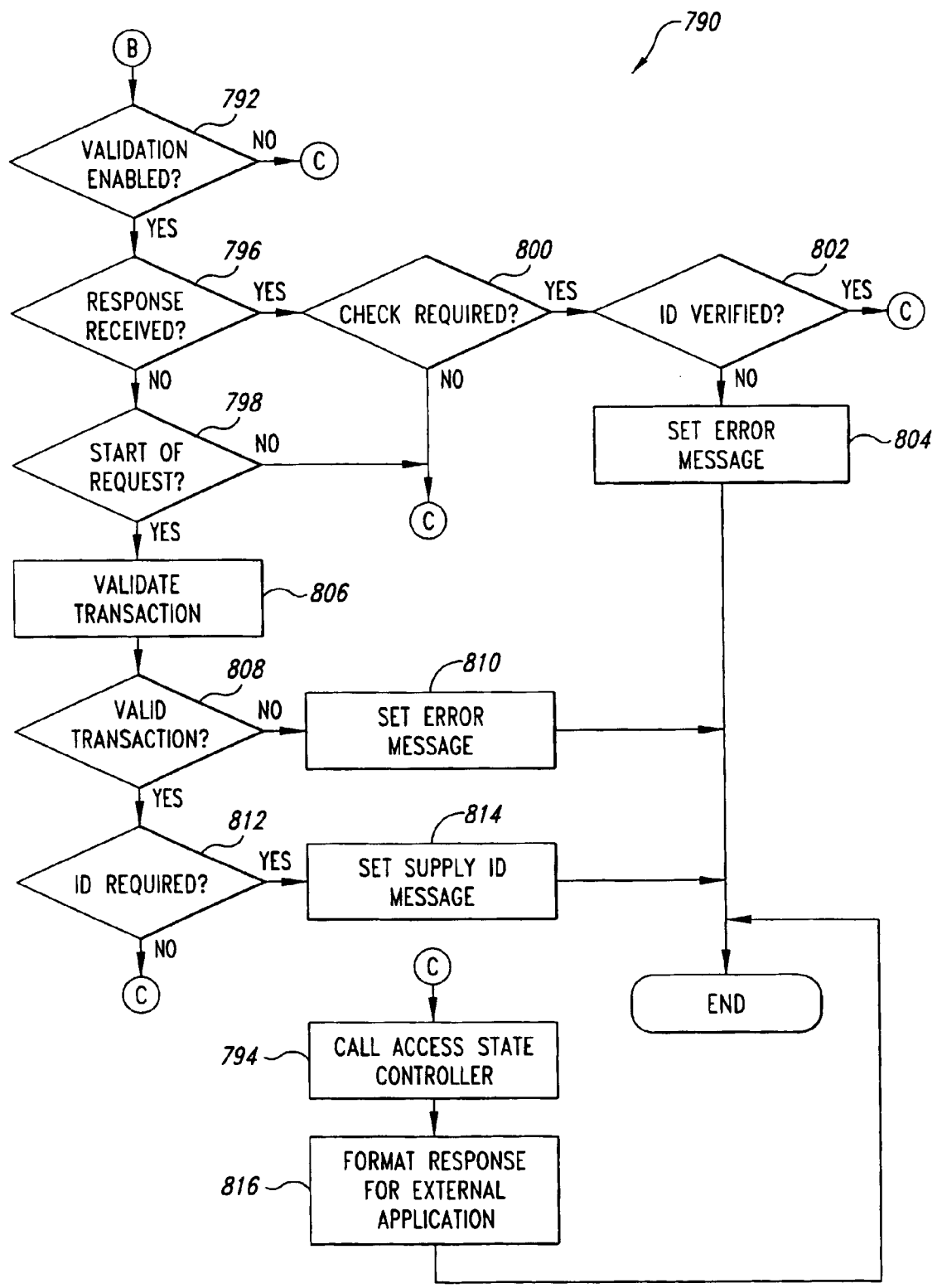

An illustration of a method 740 of a representative implementation for the external communication module 104 is shown in FIGS. 28A, 28B, and 28C. According to the method 740, the external communication module 104 receives a communication, such as one of the external communications, a determination is made whether the communication is a connect request and if not (NO branch of decision step 742), a determination is made whether the communication is a disconnect request and if not (NO branch of decision step 744), a determination is made whether the communication is a transaction request and if not (NO branch of decision step 750), an error message is set (step 752) and the method 740 returns to the caller or ends.

If the communication is a connect request (YES branch of decision step 742), a method 760, illustrated in FIG. 22B, is executed starting by determining whether filtering is enabled and if so (YES branch of decision step 762), the IP address associated with the origination of the communication is validated (step 764) and the method goes to decision step 770. If the IP address is valid (YES branch of decision step 770), resources are allocated (step 776), a success message is sent (step 778) and the method 760 returns to the caller or ends. If filtering is not enabled (NO branch of decision step 762), resources are allocated (step 766), a success message is sent (step 768), and the method 760 returns to the caller or ends. If the IP address is not valid (NO branch of decision step 770), a failure message is sent (step 772), the socket connection associated with the communication is closed (step 774), and the method 760 returns to the caller or ends. If the communication is a disconnect request (YES branch of decision step 744), internal resources are freed (step 746), a success message is set (step 748), and the method 740 returns to the caller or ends.

If the communication is a transaction request (YES branch of decision step 750), the method 790 is executed, illustrated in FIG. 22C, starting by determining whether validation has been enabled and if not (NO branch of decision step 792), the access state controller 102 is called (step 794), a response for the external application associated with the communication is formatted (step 816), and the method 790 returns to the caller or ends. Otherwise (YES branch of decision step 792), a determination is made whether a response has been received and if so (YES branch of decision step 796), a determination is made whether an identification check is required and if so (YES branch of decision step 800), identification is verified in decision step 802 described below. If an identification check is not required (NO branch of decision step 800), the method 790 goes to step 794. If identification is not verified (NO branch of decision step 802), an error message is set (step 804), and the method 790 returns to the caller or ends. If a response has not been received (NO branch of decision step 796), a determination is made whether the communication is a start of a request and if not (NO branch of decision step 798) the method 790 goes to step 794. Otherwise (YES branch of decision step 798), the transaction is validated (step 806). If the transaction is not valid (NO branch of decision step 808), an error message is set (step 810) and the method 790 returns to the caller or ends. If the transaction is valid (YES branch of decision step 808), determination is made whether identification is required and if so (YES branch of decision step 812), a message is set to supply identification (step 814) and the method 790 returns to the caller or ends. Otherwise (NO branch of decision step 812), the method 790 goes to step 794.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. An internal transaction area and internal applications running in the internal transaction area on a host computer, the internal transaction area receives compliant communication, the internal applications communicate with a computer terminal compliant with the internal transaction area, and for a host internal area access running on the host computer compliant with the internal transaction area and to provide access to the internal transaction area for external applications running outside of the internal transaction area, an internal area access communication system comprising:
    an external communication module to receive external communication including a first external communication and a second external communication sent from the external applications, the first external communication being formatted in a first format and based on a non-compliant language, the non-compliant language being non-compliant with the internal transaction area, the second external communication being formatted in a second format compliant with the internal transaction area and based on a compliant language, the compliant language being compliant with the internal transaction area, the external communication module converts the format of the first external communication from the first format into the second format, the external communication module receives internal communication originating from the internal applications having the second format, the external communication module converts, if needed, the format of the received internal communication from the second format into the first format, and sends the internal communication to the external applications based, at least in part, upon addressing of the internal communication;
    a virtual host terminal having a virtual display buffer, a virtual attributes buffer, and virtual terminal functions, the virtual host terminal receives the external communication, executes the virtual terminal functions, receives the internal communication, sends communication in the second format and based on the compliant language to be received by the internal applications, and sends communication in the second format and based upon the non-compliant language to be received by the external applications; and
    an access state controller to track state information of the internal applications, receive the external communication from the external communication module, send the external communication to at least one of the following: the virtual host terminal and the host internal area access, based upon addressing of the external communication and the state information, receive internal communication from the internal applications via the host internal area access, and send the internal communication to at least one of the following: the external communication module and the virtual host terminal based, at least in part, upon addressing of the internal communication and the state information, receive communication from the virtual host terminal, and send the communication to at least one of the following: the external communication module and the host internal area access virtual host terminal based, at least in part, upon addressing of the internal communication and the state information.

2. The system of claim 1 wherein the first format is markup language based and the second format is binary data oriented.

3. The system of claim 1 wherein the external communication module runs on the host computer.

4. The system of claim 1 wherein the access state controller runs on the host computer.

5. The system of claim 1 wherein the virtual host terminal runs on the host computer.

6. The system of claim 1 wherein the non-compliant language is selected from at least the following: High-Level Language Application Programming Interface (HLLAPI) and Server Enterprise Class Library (SEACL).

7. The system of claim 1 wherein the virtual host terminal executes at least one of the following as virtual terminal functions: to update a virtual terminal field, to set a virtual terminal cursor position, to write a character string to a virtual terminal, to count the number of fields currently on a virtual terminal screen, to locate boundaries of a given virtual terminal entry field, to locate a string within a virtual terminal display buffer, to copy a string from a display buffer, to retrieve data and attributes from buffers, to retrieve host interface or programmatic modified data, to send map formatted data to the internal transaction area, to find a target map in a map set, to get field data, to receive map formatted data from the internal transaction area, to put field data, to receive keystroke data, to receive text from the internal transaction area, to erase buffers, to erase unprotected positions in a virtual display buffer based upon corresponding attributes in the virtual attributes buffer, to retrieve an internal transaction area identification, to create a virtual terminal logon screen, and to create a virtual terminal acknowledgment screen.

8. The system of claim 1 wherein the external communication module receives external communication from at least one of the following: a same host application, an other host application, a client application, and a terminal emulation.

9. The system of claim 1 wherein the computer terminal is at least one of the following: IBM 3270, IBM 5250, DEC VT 100, DEC VT 220.

10. The system of claim 1 wherein the internal transaction area is based on IBM Customer Information Control System (CICS) and the virtual host terminal is compliant with IBM CICS.

11. The system of claim 1 wherein the external communication originates from terminal emulation applications that emulate terminals that are non-compliant with the internal transaction area, further including a terminal exchange to receive the external communication and translate the external communication to be received by the virtual host terminal.

12. The system of claim 11, further including a listener to listen for initial connect requests from the external applications and to pass off subsequent communication with the external applications to the terminal exchange and the external communication module based upon the originating external application.

13. The system of claim 1, further including an external security manager wherein the virtual host terminal receives usernames and passwords from the external applications to supply to the external security manager.

14. An internal transaction area and internal applications running in the internal transaction area on a host computer, the internal transaction area receives compliant communication, the internal applications that communicate with a computer terminal compliant with the internal transaction area, and for a host internal area access running on the host computer compliant with the internal transaction area and to provide access to the internal transaction area for external applications running outside of the internal transaction area, a method comprising:

receiving external communication including a first external communication and a second external communication sent from the external applications, the first external communication being formatted in a first format and based on a non-compliant language, the non-compliant language being non-compliant with the internal transaction area, the second external communication being formatted in a second format compliant with the internal transaction area and based on a compliant language, the compliant language being compliant with the internal transaction area;

converting the format of the first external communication from the first format into the second format;

receiving internal communication originating from the internal applications having the second format via the host internal area access;

executing at least one virtual terminal function based upon at least one of the following: the internal communication and the external communication;

in response to executing at least one virtual terminal function, performing at least one of the following: sending a communication in the second format and based on the compliant language for receipt by the internal applications, and sending the communication in the second format and based upon the non-compliant language for receipt by the external applications;

tracking state information of the internal applications;

routing the external communication based, at least in part, upon the tracked state information for at least one of the following: executing at least on virtual terminal function and sending to the host internal area access;

routing the internal communication based, at least in part, upon the tracked state information for at least one of the following: sending to the external applications and executing the virtual terminal functions; and routing the communication based, at least in part, upon the tracked state information for at least one of the following: sending the communication to the external applications and sending the communication to the host internal area access.

15. The method of claim 14, further including converting, if needed, the format of the received internal communication from the second format into the first format.

16. The method of claim 14, further including sending the internal communication to the external applications based, at least in part, upon addressing of the internal communication.

17. The method of claim 14 wherein the external communication contains at least one of the following: a username and a password, and in response to executing at least one virtual terminal function, sending at least one of the following to an external security manager running on the host computer: a username and a password.

18. The method of claim 14 wherein the external communication originates from terminal emulation applications that emulate terminals that are noncompliant with the internal transaction area, and further including translating the external communication to be compliant with the internal transaction area.

19. The method of claim 14 wherein the executing at least one virtual terminal function includes at least one of the following: updating a virtual terminal field, setting a virtual terminal cursor position, writing a character string to a virtual terminal, counting the number of fields currently on a virtual terminal screen, locating boundaries of a given virtual terminal entry field, locating a string within a virtual terminal display buffer, copying a string from a display buffer, retrieving data and attributes from buffers, retrieving host interface or programmatic modified data, sending map formatted data to the internal transaction area, finding a target map in a map set, getting field data, receiving map formatted data from the internal transaction area, putting field data, receiving keystroke data, receiving text from the internal transaction area, erasing buffers, erasing unprotected positions in a virtual display buffer based upon corresponding attributes in a virtual attributes buffer, retrieving an internal transaction area identification, creating a virtual terminal logon screen, and creating a virtual terminal acknowledgment screen.

20. The method of claim 14 wherein the converting the format includes at least one of the following: converting from High-Level Language Application Programming Interface (HLLAPI) and converting from Server Enterprise Class Library (SEACL).

21. For an internal transaction area and internal applications running in the internal transaction area on a host computer, the internal transaction area receives compliant communication, the internal applications communicate with a computer terminal compliant with the internal transaction area, and for a host internal area access running on the host computer compliant with the internal transaction area and to provide access to the internal transaction area for external applications running outside of the internal transaction area, a computer-readable storage medium whose contents cause a computer to perform by:

receiving external communication including a first external communication and a second external communication sent from the external applications, the first external communication being formatted in a first format and based on a non-compliant language, the non-compliant language being non-compliant with the internal transaction area, the second external communication being formatted in a second format compliant with the internal transaction area and based on a compliant language, the compliant language being compliant with the internal transaction area;

converting the format of the first external communication from the first format into the second format;

receiving internal communication originating from the internal applications having the second format via the host internal area access;

executing at least one virtual terminal function based upon at least one of the following: the internal communication and the external communication;

in response to executing at least one virtual terminal function, performing at least one of the following: sending a communication in the second format and based on the compliant language for receipt by the internal applications, and sending the communication in the second format and based upon the non-compliant language for receipt by the external applications;

tracking state information of the internal applications;

routing the external communication based, at least in part, upon the tracked state information for at least one of the following: executing at least on virtual terminal function and sending to the host internal area access;

routing the internal communication based, at least in part, upon the tracked state information for at least one of the following: sending to the external applications and executing the virtual terminal functions; and routing the communication based, at least in part, upon the tracked state information for at least one of the following: sending the communication to the external applications and sending the communication to the host internal area access.

22. The computer-readable storage medium of claim 21, further including converting, if needed, the format of the received internal communication from the second format into the first format.

23. The computer-readable storage medium of claim 21, further including sending the internal communication to the external applications based, at least in part, upon addressing of the internal communication.

24. The computer-readable storage medium of claim 21 wherein the external communication contains at least one of the following: a username and a password, and in response to executing at least one virtual terminal function, sending at least one of the following to an external security manager running on the host computer: a username and a password.

25. The computer-readable storage medium of claim 21 wherein the external communication originates from terminal emulation applications that emulate terminals that are non-compliant with the internal transaction area, and further including translating the external communication to be compliant with the internal transaction area.

26. The computer-readable storage medium of claim 21 wherein the executing at least one virtual terminal function includes at least one of the following: updating a virtual terminal field, setting a virtual terminal cursor position, writing a character string to a virtual terminal, counting the number of fields currently on a virtual terminal screen, locating boundaries of a given virtual terminal entry field, locating a string within a virtual terminal display buffer, copying a string from a display buffer, retrieving data and attributes from buffers, retrieving host interface or programmatic modified data, sending map formatted data to the internal transaction area, finding a target map in a map set, getting field data, receiving map formatted data from the internal transaction area, putting field data, receiving keystroke data, receiving text from the internal transaction area, erasing buffers, erasing unprotected positions in a virtual display buffer based upon corresponding attributes in a virtual attributes buffer, retrieving an internal transaction area identification, creating a virtual terminal logon screen, and creating a virtual terminal acknowledgment screen.

27. The computer-readable storage medium of claim 21 wherein the converting the format includes at least one of the following: converting from High-Level Language Application Programming Interface (HLLAPI) and converting from Server Enterprise Class Library (SEACL).

28. An internal transaction area and internal applications running in the internal transaction area on a host computer, the internal transaction area to receive compliant communication, the internal applications to communicate with a computer terminal compliant with the internal transaction area, and for a host internal area access running on the host computer compliant with the internal transaction area and to provide access to the internal transaction area for external applications running outside of the internal transaction area, an internal area access communication system comprising:

means for receiving external communication including a first external communication and a second external communication sent from the external applications, the first external communication being formatted in a first format and based on a non-compliant language, the non-compliant language being non-compliant with the internal transaction area, the second external communication being formatted in a second format compliant with the internal transaction area and based on a compliant language, the compliant language being compliant with the internal transaction area;

means for converting the format of the first external communication from the first format into the second format;

means for receiving internal communication originating from the internal applications having the second format via the host internal area access;

means for executing at least one virtual terminal function based upon at least one of the following: the internal communication and the external communication;

in response to executing at least one virtual terminal function, means for performing at least one of the following: sending a communication in the second format and based on the compliant language for receipt by the internal applications, and sending the communication in the second format and based upon the non-compliant language for receipt by the external applications;

means for tracking state information of the internal applications;

means for routing the external communication based, at least in part, upon the tracked state information for at least one of the following: executing at least on virtual terminal function and sending to the host internal area access;

means for routing the internal communication based, at least in part, upon the tracked state information for at least one of the following: sending to the external applications and executing the virtual terminal functions; and means for routing the communication based, at least in part, upon the tracked state information for at least one of the following: sending the communication to the external applications and sending the communication to the host internal area access.

29. The system of claim 28, further including means for converting, if needed, the format of the received internal communication from the second format into the first format.

30. The system of claim 28, further including means for sending the internal communication to the external applications based, at least in part, upon addressing of the internal communication.

31. The system of claim 28 wherein the external communication contains at least one of the following: a username and a password, and in response to executing at least one virtual terminal function, means for sending at least one of the following to an external security manager running on the host computer: a username and a password.

32. The system of claim 28 wherein the external communication originates from terminal emulation applications that emulate terminals that are non-compliant with the internal transaction area, and further including means for translating the external communication to be compliant with the internal transaction area.

33. The system of claim 28 wherein the means for executing at least one virtual terminal function includes at least one of the following: updating a virtual terminal field, setting a virtual terminal cursor position, writing a character string to a virtual terminal, counting the number of fields currently on a virtual terminal screen, locating boundaries of a given virtual terminal entry field, locating a string within a virtual terminal display buffer, copying a string from a display buffer, retrieving data and attributes from buffers, retrieving host interface or programmatic modified data, sending map formatted data to the internal transaction area, finding a target map in a map set, getting field data, receiving map formatted data from the internal transaction area, putting field data, receiving keystroke data, receiving text from the internal transaction area, erasing buffers, erasing unprotected positions in a virtual display buffer based upon corresponding attributes in a virtual attributes buffer, retrieving an internal transaction area identification, creating a virtual terminal logon screen, and creating a virtual terminal acknowledgment screen.

34. The system of claim 28 wherein the means for converting the format includes at least one of the following: converting from High-Level Language Application Programming Interface (HLLAPI) and converting from Server Enterprise Class Library (SEACL).

* * * * *